United States Patent
Mishra

(10) Patent No.: US 12,147,430 B1
(45) Date of Patent: *Nov. 19, 2024

(54) REAL-TIME SEARCH AND RETRIEVAL OF STREAMING SENSOR DATA

(71) Applicant: Armada Systems Inc., Greebrae, CA (US)

(72) Inventor: Pragyana K Mishra, Seattle, WA (US)

(73) Assignee: Armada Systems Inc., Greebrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,236

(22) Filed: Apr. 3, 2024

Related U.S. Application Data

(63) Continuation of application No. 18/524,576, filed on Nov. 30, 2023, now Pat. No. 12,026,164, which is a continuation of application No. 18/461,349, filed on Sep. 5, 2023, now Pat. No. 11,899,671.

(51) Int. Cl.
G06F 16/2455 (2019.01)
G06F 16/22 (2019.01)

(52) U.S. Cl.
CPC .... G06F 16/24568 (2019.01); G06F 16/2228 (2019.01)

(58) Field of Classification Search
CPC ................ G06F 16/24568; G06F 16/2228
See application file for complete search history.

(56) References Cited

U.S. PATENT DOCUMENTS

| | | |
|---|---|---|
| 11,145,208 B1 | 10/2021 | Nanda et al. |
| 11,201,939 B1 | 12/2021 | Mokashi et al. |
| 11,238,849 B1 | 2/2022 | Mimassi |
| 11,405,801 B1 | 8/2022 | Qureshi et al. |
| 11,410,423 B1 | 8/2022 | Naslavsky et al. |
| 11,695,632 B1 | 7/2023 | Zoualfaghari et al. |
| 11,741,760 B1 | 8/2023 | Dubin et al. |

(Continued)

OTHER PUBLICATIONS

Abbas, Khizar, et al. "Network slice lifesycle management for 5g mobile networks: An intent-based networking approach." IEEE Access 9: 80128-80146. (Year: 2021).

(Continued)

*Primary Examiner* — Cam Y T Truong
(74) *Attorney, Agent, or Firm* — Polsinelli PC

(57) ABSTRACT

Systems and techniques are provided for processing streaming data. For example, a process can include obtaining, by an edge device, a plurality of data streams corresponding to objects, activities, or events registered in an edge environment associated with the edge device. One or more machine learning networks implemented on the edge device can generate a plurality of features and/or embeddings corresponding to each respective data stream of the plurality of data streams. The edge device can determine a subset of salient content from the plurality of data streams, based on analyzing the plurality of features and/or embeddings generated for each respective data stream. The edge device can generate index information corresponding to the determined subset of salient content. The subset of salient content and the generated index information can be stored locally at the edge device for search and retrieval based on local queries received at the edge device.

29 Claims, 7 Drawing Sheets

(56) References Cited

U.S. PATENT DOCUMENTS

| | | |
|---|---|---|
| 11,876,858 B1 | 1/2024 | Nair et al. |
| 11,907,093 B1 | 2/2024 | Nair et al. |
| 2005/0156715 A1 | 7/2005 | Zou et al. |
| 2009/0079555 A1 | 3/2009 | Aguirre De Carcer et al. |
| 2009/0249215 A1 | 10/2009 | Paek |
| 2012/0123951 A1 | 5/2012 | Hyatt et al. |
| 2015/0120749 A1* | 4/2015 | Phanishayee ....... G06F 16/2228 707/741 |
| 2016/0093119 A1 | 3/2016 | Ahn et al. |
| 2016/0117059 A1 | 4/2016 | Folken et al. |
| 2017/0285623 A1 | 10/2017 | Figoli et al. |
| 2018/0025304 A1 | 1/2018 | Fisher et al. |
| 2018/0032915 A1 | 2/2018 | Nagaraju et al. |
| 2018/0082152 A1 | 3/2018 | Katz et al. |
| 2018/0341720 A1* | 11/2018 | Bhatia ..................... G06F 17/10 |
| 2019/0156246 A1 | 5/2019 | Kuo et al. |
| 2019/0212754 A1 | 7/2019 | Smith |
| 2019/0258747 A1 | 8/2019 | Milev |
| 2019/0370686 A1 | 12/2019 | Pezzillo et al. |
| 2020/0027033 A1 | 1/2020 | Garg et al. |
| 2020/0112612 A1 | 4/2020 | Chandaria |
| 2020/0136994 A1 | 4/2020 | Doshi et al. |
| 2020/0153623 A1 | 5/2020 | Asanghanwa et al. |
| 2020/0160207 A1 | 5/2020 | Song et al. |
| 2020/0267053 A1 | 8/2020 | Zheng et al. |
| 2020/0286020 A1 | 9/2020 | Kobayashi et al. |
| 2020/0349852 A1 | 11/2020 | DiCosola |
| 2020/0374974 A1 | 11/2020 | Sun et al. |
| 2020/0379805 A1 | 12/2020 | Porter et al. |
| 2020/0401891 A1 | 12/2020 | Xu et al. |
| 2021/0108937 A1 | 4/2021 | Fox et al. |
| 2021/0112441 A1 | 4/2021 | Sabella et al. |
| 2021/0117859 A1 | 4/2021 | Rogers et al. |
| 2021/0136869 A1 | 5/2021 | Radmand et al. |
| 2021/0243232 A1 | 8/2021 | Verma et al. |
| 2021/0266225 A1 | 8/2021 | Kozhaya et al. |
| 2021/0304418 A1 | 9/2021 | Soon-Shiong |
| 2021/0360070 A1 | 11/2021 | Cella et al. |
| 2021/0392049 A1 | 12/2021 | Jeuk et al. |
| 2022/0015269 A1 | 1/2022 | Xu et al. |
| 2022/0019422 A1 | 1/2022 | Anderson |
| 2022/0035878 A1 | 2/2022 | Sarah et al. |
| 2022/0060455 A1 | 2/2022 | Rosenstein et al. |
| 2022/0121556 A1 | 4/2022 | Guim Bernat et al. |
| 2022/0150125 A1 | 5/2022 | Kumar et al. |
| 2022/0197304 A1 | 6/2022 | Cochran et al. |
| 2022/0345518 A1 | 10/2022 | Sgobba et al. |
| 2022/0353732 A1 | 11/2022 | Filippou et al. |
| 2022/0360957 A1 | 11/2022 | Seawall et al. |
| 2022/0383859 A1 | 12/2022 | Mimassi |
| 2022/0405157 A1 | 12/2022 | Bender |
| 2022/0410750 A1 | 12/2022 | Mangal et al. |
| 2023/0021216 A1 | 1/2023 | Shilawat et al. |
| 2023/0028338 A1 | 1/2023 | Samuelsson et al. |
| 2023/0044620 A1 | 2/2023 | Shochat et al. |
| 2023/0064472 A1 | 3/2023 | Endel et al. |
| 2023/0066765 A1 | 3/2023 | Thomas et al. |
| 2023/0101308 A1 | 3/2023 | Amano |
| 2023/0141055 A1 | 5/2023 | Kim et al. |
| 2023/0147814 A1 | 5/2023 | Carver et al. |
| 2023/0164033 A1 | 5/2023 | Lee et al. |
| 2023/0171235 A1 | 6/2023 | Chhibber et al. |
| 2023/0205606 A1 | 6/2023 | Palermo et al. |
| 2023/0205994 A1 | 6/2023 | Wei et al. |
| 2023/0244470 A1 | 8/2023 | Shimon et al. |
| 2023/0280059 A1 | 9/2023 | Khan et al. |
| 2023/0300195 A1 | 9/2023 | Sharma et al. |
| 2023/0316927 A1 | 10/2023 | Kumavat et al. |
| 2023/0325725 A1 | 10/2023 | Lester et al. |
| 2023/0359600 A1 | 11/2023 | Donthireddy et al. |
| 2023/0360679 A1 | 11/2023 | Sharma et al. |
| 2023/0368281 A1 | 11/2023 | Kobel et al. |
| 2023/0368637 A1 | 11/2023 | Ngala-Ngala et al. |

OTHER PUBLICATIONS

Hsu, Tz-Heng, Zhi-Hao Wang, & Aaron Raymond See, "A cloud-edge-smart IoT architecture for speeding up the deployment of neural network models wih transfer learning techniques." Electronics 11.14: 2255. (Year: 2002).

Huang, Lei, "Armada: A Robust Latency-Sensitive Edge Cloud in Heterogeneous Edge-Dense Environments" Jul. 2021.

Huang, Lei, "Armada: A Robust Latency-Sensitive Edge Cloud in Heterogeneous Edge-Dense Environments" Nov. 23, 2021.

Sharma, Divyasheel, et al. "Enabling Inference and Training of Deep Learning Models for AI Applications on IoT Edge Devices", Atrificial Intelligence-based Internet of THings Systems: 267-283. (Year: 2022).

Wang, Hao, et al.; "Optimizing federated learning on non-iid data with reinforcement learning." IEEE Infocom 2020—IEEE Conference in Computer Communications. IEEE (Year: 2020)v.

Wang, Nan, et al., "ENORM: A framework for edge node resource management." IEEE transactions on services computing 13.6: 1086-1099. (Year: 2017).

Xu, Wenyuan, et al. "Accelerating federated learning for Iot iot in big data analytics with pruning, quantization and elective updating." IEEE Access 9: 38457-38466. (Year: 2021).

Huang, Lei, et al. "Towards Elasticity in Heterogeneours Edge-dense Environemtns." 2022 IEEE 42nd International Conference on Distributed Computing Systems (ICDCS). IEEE. (Year: 2022).

* cited by examiner

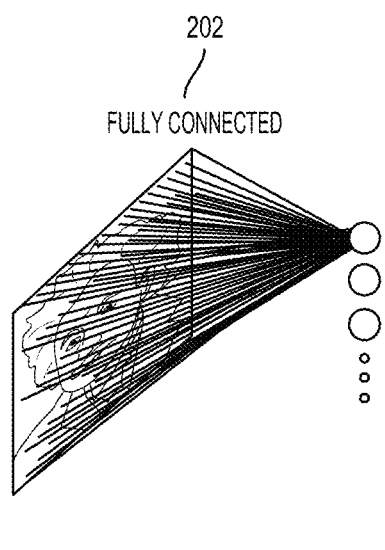
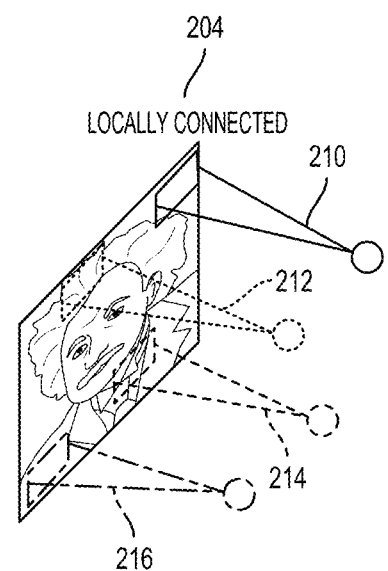
FIG. 2A　　　　　FIG. 2B

REAL-TIME SEARCH AND RETRIEVAL OF STREAMING SENSOR DATA

CROSS-REFERENCE TO RELATED APPLICATIONS

This application is a continuation of U.S. Non-Provisional application Ser. No. 18/524,576, filed Nov. 30, 2023, which is a continuation of U.S. Non-Provisional application Ser. No. 18/461,349, filed Sep. 5, 2023, the disclosures of which are hereby incorporated by reference, in their entirety and for all purposes.

TECHNICAL FIELD

The present disclosure pertains to edge computing, and more specifically pertains to systems and techniques for implementing real-time search and retrieval of streaming data or content at the edge without the need for cloud connectivity.

BACKGROUND

Edge computing is a distributed computing paradigm that can be used to decentralize data processing and other computational operations by bringing compute capability and data storage closer to the edge (e.g., the location where the compute and/or data storage is needed, often at the "edge" of a network such as the internet). Edge computing systems are often provided in the same location where input data is generated and/or in the same location where an output result of the computational operations is needed. The use of edge computing systems can reduce latency and bandwidth usage, as data is ingested and processed locally at the edge and rather than being transmitted to a more centralized location for processing. An edge computing system can provide a secure and private environment where sensitive data can be stored and processed locally.

In many existing cloud computing architectures, data generated at endpoints (e.g., mobile devices, Internet of Things (IoT) sensors, robots, industrial automation systems, security cameras, etc., among various other edge devices and sensors) is transmitted to centralized data centers for processing. The processed results are then transmitted from the centralized data centers to the endpoints requesting the processed results. The centralized processing approach may present challenges for growing use cases, such as for real-time applications and/or artificial intelligence (AI) and machine learning (ML) workloads. For instance, centralized processing models and conventional cloud computing architectures can face constraints in the areas of latency, availability, bandwidth usage, data privacy, network security, and the capacity to process large volumes of data in a timely manner.

In the context of edge computing, the "edge" refers to the edge of the network, close to the endpoint devices and the sources of data. In an edge computing architecture, computation and data storage are distributed across a network of edge nodes that are near the endpoint devices and sources of data. The edge nodes can be configured to perform various tasks relating to data processing, storage, analysis, etc. Based on using the edge nodes to process data locally, the amount of data that is transferred from the edge to the cloud (or other centralized data center) can be significantly reduced. Accordingly, the use of edge computing has become increasingly popular for implementing a diverse range of AI and ML applications, as well as for serving other use cases that demand real-time processing, minimal latency, and high reliability. In general, such applications and use cases may rely on high-bandwidth sensors that have the ability to generate data at massive rates (e.g., on the order of 50 Gbit/sec or 22 TB/hr).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for processing streaming data at the edge. For instance, the systems and techniques can be used to perform real-time search and retrieval of streaming sensor data and/or streaming content at the edge, based on using an edge compute device to process, store, and/or index sensor data or other content in-situ (e.g., after being generated at the edge). In some aspects, the systems and techniques can be used to perform the real-time search and retrieval at the edge, without utilizing cloud connectivity, storage, and/or compute resources. In some examples, a hybrid approach can be implemented that retrieves and ranks content based on a combination of indexes and content stored at the edge and indexes and content persisted in the cloud.

According to at least one illustrative example, a method of processing streaming data is provided. The method includes: obtaining, by an edge device, a plurality of data streams corresponding to objects, activities, or events registered in an edge environment associated with the edge device; generating, using one or more machine learning networks implemented on the edge device, a plurality of features corresponding to each respective data stream of the plurality of data streams; determining, by the edge device, a subset of salient content from the plurality of data streams, wherein the subset of salient content is determined based on analyzing the plurality of features generated for each respective data stream; generating, by the edge device, index information corresponding to the determined subset of salient content; and storing the subset of salient content and the generated index information locally at the edge device for search and retrieval based on local queries received at the edge device.

In another illustrative example, an apparatus is provided for processing streaming data. The apparatus includes at least one memory and at least one processor coupled to the at least one memory and configured to: obtain, by an edge device, a plurality of data streams corresponding to objects, activities, or events registered in an edge environment associated with the edge device; generate, using one or more machine learning networks implemented on the edge device, a plurality of features corresponding to each respective data stream of the plurality of data streams; determine, by the edge device, a subset of salient content from the plurality of data streams, wherein the subset of salient content is determined based on analyzing the plurality of features generated for each respective data stream; generate, by the edge device, index information corresponding to the determined subset of salient content; and store the subset of salient content and the generated index information locally at the edge device for search and retrieval based on local queries received at the edge device.

In another illustrative example, a non-transitory computer-readable storage medium is provided and comprises instructions stored thereon which, when executed by at least one processor, causes the at least one processor to: obtain, by an edge device, a plurality of data streams corresponding to objects, activities, or events registered in an edge environment associated with the edge device; generate, using one or more machine learning networks implemented on the edge device, a plurality of features corresponding to each respective data stream of the plurality of data streams; determine, by the edge device, a subset of salient content from the plurality of data streams, wherein the subset of salient content is determined based on analyzing the plurality of features generated for each respective data stream; generate, by the edge device, index information corresponding to the determined subset of salient content; and store the subset of salient content and the generated index information locally at the edge.

In another illustrative example, an apparatus is provided for processing streaming data. The apparatus includes: means for obtaining, by an edge device, a plurality of data streams corresponding to objects, activities, or events registered in an edge environment associated with the edge device; means for generating, using one or more machine learning networks implemented on the edge device, a plurality of features corresponding to each respective data stream of the plurality of data streams; means for determining, by the edge device, a subset of salient content from the plurality of data streams, wherein the subset of salient content is determined based on analyzing the plurality of features generated for each respective data stream; means for generating, by the edge device, index information corresponding to the determined subset of salient content; and means for storing the subset of salient content and the generated index information locally at the edge device for search and retrieval based on local queries received at the edge device.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), robotic unit (e.g., uncrewed ground vehicle, uncrewed aerial vehicle, articulated arm, visual inspection system, cobot, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

The term "network entity" or "base station" may refer to a single physical Transmission-Reception Point (TRP) or to multiple physical Transmission-Reception Points (TRPs) that may or may not be co-located. For example, where the term "network entity" or "base station" refers to a single physical TRP, the physical TRP may be an antenna of a base station (e.g., satellite constellation ground station/internet gateway) corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Because a TRP is the point from which a base station transmits and receives wireless signals, as used herein, references to transmission from or reception at a base station are to be understood as referring to a particular TRP of the base station. An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim. The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example of a fully connected neural network, in accordance with some examples;

FIG. 2B illustrates an example of a locally connected neural network, in accordance with some examples;

DETAILED DESCRIPTION

Figure 1:
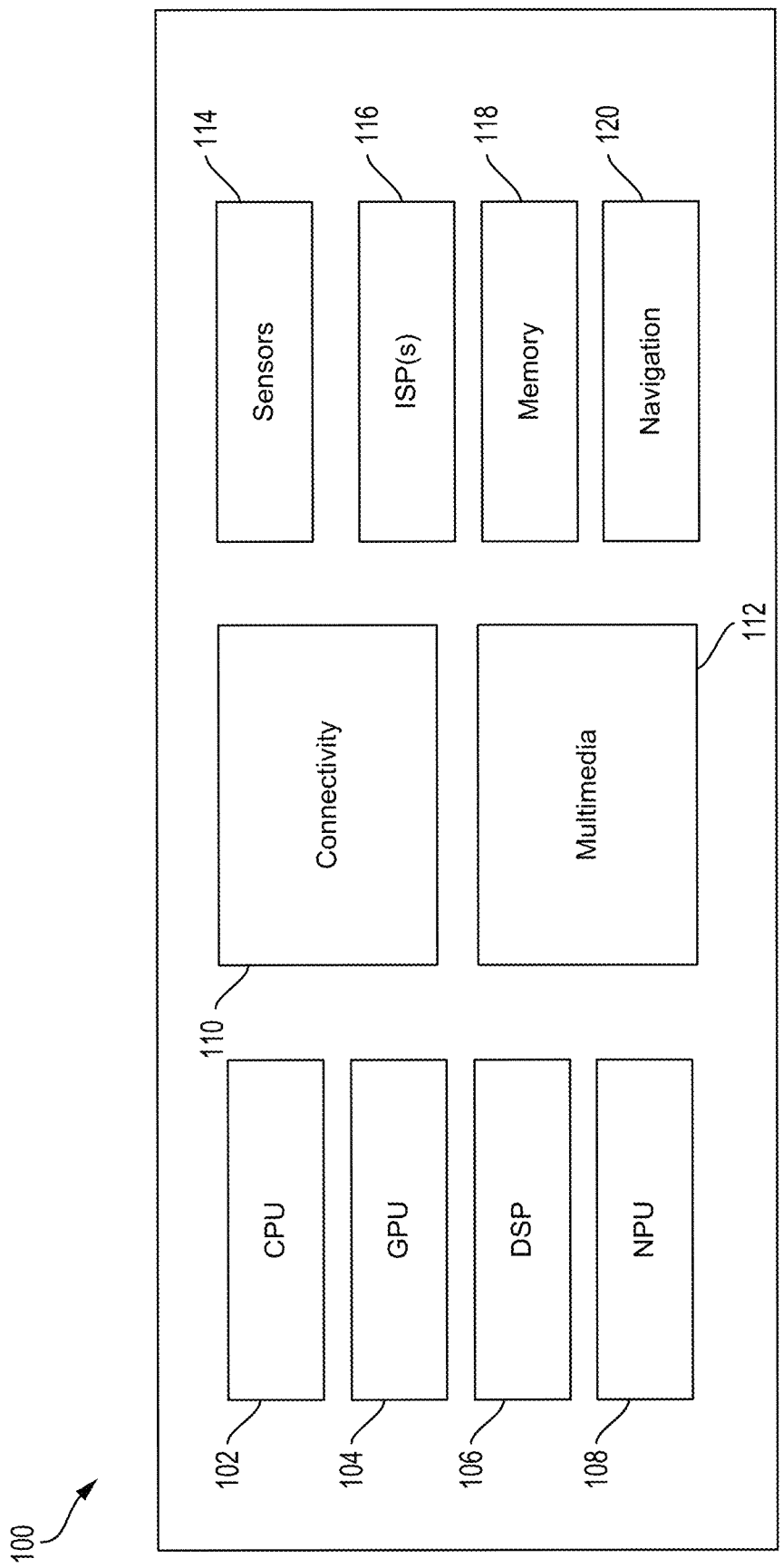
FIG. 1 illustrates an example implementation of a system-on-a-chip (SoC), in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Overview

Systems, apparatuses, methods (also referred to as processes), and computer-readable media (collectively referred to herein as "systems and techniques") are described herein for real-time search and retrieval of streaming sensor data and/or streaming content at the edge. In one illustrative example, the real-time search and retrieval of streaming sensor data and/or streaming content can be performed using one or more edge compute devices (e.g., also referred to herein as "edge device") deployed to an edge site or edge location. In some examples, the edge compute device can be provided as a high-performance compute and storage (HPCS) edge device, including an elastic HPCS (E-HPCS) edge device.

According to aspects of the present disclosure, the real-time search and retrieval of streaming sensor data and/or streaming content can be performed at the edge without the need for cloud connectivity, cloud storage, and/or cloud compute, etc. For example, one or more edge devices (e.g., HPCS, E-HPCS, etc.) can be used to process, store, and index respective streams of sensor data or other content in situ at the edge. The respective streams of sensor data or other content at the edge can be processed, stored, and indexed in substantially real-time after or soon as the respective streams of sensor data or content are generated.

Performing real-time search and retrieval at the edge can reduce or eliminate the latency that would otherwise be associated with conventional implementations in which data generated at the edge must be transmitted to a centralized cloud or data center for processing, and the processing results then transmitted back to the edge from the centralized cloud or data center. Additionally, the systems and techniques described herein for real-time search and retrieval can reduce the search and retrieval time associated with querying indexed and/or stored data at the edge. For example, queries can be received locally (e.g., at the edge) and analyzed against index information corresponding to data that is stored and/or was previously ingested at the edge. In some aspects, the edge device can generate index information in the form of an inverted index (e.g., also referred to as an "inverse index.").

In some aspects, the systems and techniques can be configured to perform real-time index generation, in-situ at an edge location or edge device that receives streaming data and/or content. For example, as data (e.g., video, images, text and/or numerical data, audio files or transcripts, sensor readings, etc.) are streamed from a plurality of sensors into the edge device, the edge device can generate corresponding index information for the streamed data in substantially real-time. The streaming data ingested into and processed by the edge device can be immediately indexed and stored locally at the edge. For instance, the streaming data can be stored onboard the edge device, can be stored using one or more local edge databases associated with the edge device or otherwise deployed to the same edge location, etc. The streaming data can be stored in combination with the corresponding index information generated by the edge device at the time of ingesting each respective portion of the streaming data.

In one illustrative example, the edge device can be implemented as a high-performance computing (HPC) device. An HPC edge device can perform the indexing (e.g., real-time or near-real-time index generation) based on using one or more machine learning (ML) and/or artificial intelligence (AI) models, networks, algorithms, etc., to perform tasks that can include, but are not limited to, feature extraction, embeddings generation, tokenization, etc., of data streaming from the connected sensors or other edge assets associated with the HPC edge device.

These aspects and more are described in greater detail below, with reference to the figures.

Example Embodiments

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, WiFi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected. SOC 100 and/or components thereof may be configured to perform image processing using machine learning techniques according to aspects of the present disclosure discussed herein. For example, SOC 100 and/or components thereof may be configured to perform semantic image segmentation and/or object detection according to aspects of the present disclosure.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can be an output of applying one or more filters, kernels, weights, or the like to an input. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

Streaming Sensor Data and or Streaming Content at the Edge

Various AI and ML applications (also referred to as workloads, workflows, tasks, etc.) can benefit from edge computing or otherwise being implemented at the edge. Edge computing can play an important role in providing a wide range of AI and ML applications, including (but not limited to) for use cases that utilize real-time processing, high reliability, and minimal latency—all three of which are features of edge computing and the edge compute units described herein.

For example, edge-deployed AI and ML applications may make heavy use of one or more high-bandwidth sensors (e.g., such as high-speed and/or HD cameras, stereo cameras, 3D scanners, LiDAR cameras and/or sensor systems, RADAR, ultrasonic sensors, vibrometers, accelerometers, gyroscopes, and other inertial sensor packages, fiber optic sensor, radar, ultrasonic sensors, etc.). Additionally, multi-modal sensor packages may include multiple sensors operating over multiple different modalities and/or sensor domains. These multi-modal sensor packages can generate and/or stream data at rates that can exceed 50 Gbit/s (e.g., 22 TB/hr).

Sensor data streams, either high-bandwidth or otherwise, can be provided to one or more AI or ML models that are configured (e.g., trained) to process such sensor data for purposes such as real-time decision making and analytics (among various other purposes). For instance, ML and AI models that may be associated with ingesting and/or processing massive or high-bandwidth data streams can include, but are not limited to, deep neural networks (DNNs), convolutional neural networks (CNNs), region-based CNNs (R-CNNs), recurrent neural networks (RNNs), long short-term memory (LSTM) networks, vision transformers (ViTs), variational autoencoders (VAEs), generative adversarial networks (GANs), autoencoders, transformers, bidirectional encoder representations from transformers (BERT), stable diffusion, attention mechanisms, and/or large language models (LLMs), etc.

In one illustrative example, a typical offshore drilling platform produces a substantial amount of data, ranging from 2-4 TB per day. Of this 2-4 TB of raw data generated each day, approximately 80% may remain unused (e.g., 1.6-3.2 TB/day). Even a solitary oil rig operating remotely in a northern environment can generate over 1 TB of data per day, and in this example, with less than 1% of that data being utilized for analytical and/or decision-making purposes. The challenges of generated data volume can become exponentially more difficult with the remoteness of the operating environment. In particular, the difficulty of managing and utilizing large volumes of generated sensor data can increase non-linearly with the separation distance from existing data networks and other communication infrastructure for uploading/transmitting the generated sensor data.

For instance, sensor data generated in remote operating environments often cannot be transmitted over conventional fiber optic or other physical/wired internet communication links, based in large part on the lack of such infrastructure in or near the remote operating environment. Consequently, sensor data generated in remote operating environments often must be transmitted over much slower (and often more expensive) wireless communication links, such as cellular and/or satellite communication links.

A satellite communication link with a 25 Mbps upload speed will take approximately 90 hours (approximately four straight days) to transmit 1 TB of data-meaning that the example oil rig generating 1 TB/day will quickly bottleneck any data upload from the oil rig to a data center. The challenge becomes more profound, and increasingly untenable, as the amount of generated data increases. For instance, a large-scale refinery can easily generate in excess of 10 TB of raw data each day.

One common type of unstructured data that may be generated on a daily (or other regular) basis is video data captured by cameras local to an operating site. Video data captured by cameras often falls into the category of unstructured data because such video data comprises raw visual information without a pre-defined structure or format. The increased use and availability of high-resolution cameras for tasks such as video-based monitoring, scene understanding, and/or navigation applications, etc., has led to a surge in unstructured video data generation. For instance, a 4K camera capturing 30 frames-per-second (fps) generates 5.4 TB of uncompressed video data within a single hour.

Similar increases in raw data generation can be seen in the context of autonomous vehicles (AVs) that are each equipped with multiple cameras and sensor packages (e.g., lidar, radar, ultrasonic sensors, IMUs/INSs, etc.). The data generation rate of a single AV can reach or exceed 50 Gbit/sec. In the AV use case, a significant portion of this 50 Gbit/sec raw data generation can necessitate local and real-time processing in order to enable low-latency decision making for the navigation and control of the AV as the AV moves through its environment. Notably, even a single IP camera can make an appreciable contribution to the overall sensor data firehose described above-streaming at rates ranging from 0.01-1.20 Mbit/sec, a single IP camera can generate anywhere between 5-500 MB of data per hour.

Sensors such as IP cameras are often deployed in large quantities, and consequently these deployments of seemingly low bandwidth contributors can have significant impacts when considered as a whole. Consider the example of a stadium that equips IP cameras as part of an extensive security or monitoring system, with a total deployment count of 900 IP cameras. In just a single hour, the 900 IP camera security system can generate half a terabyte (0.5 TB) of video data alone. In the security and monitoring scenario, the IP camera video data needs to be processed in substantially real-time for purposes such as event logistics, threat detection, safety monitoring, etc. While it is possible for various forms of unstructured data (e.g., such as the IP camera video data) to be indexed and stored for later retrieval, the common use cases for such unstructured data are often themselves the primary driver of the need for substantially real-time processing and analytical capabilities.

Table 1, below, summarizes various example scenarios/use cases for AI and ML applications in the context of edge computing. Also presented in Table 1 are example requirements for respective sensing, bandwidth, compute, and storage corresponding to each example use case (although it is noted that the information of Table 1 is provided for purposes of illustration and example, and is not intended to be construed as limiting):

TABLE 1

Example use case scenarios and corresponding compute requirements and parameters for various AI and ML applications at the edge.

| Industry | Sensors | Bandwidth | Compute (AI/ML) Applications | Storage |
|---|---|---|---|---|
| Energy (offshore oil drilling) | Fiber optic sensors, cameras, pressure, temperature, flow, ultrasonic sensors | 0.2-0.4 Gbit/sec | 40-300 TOPS (drilling productivity, fault detection, real-time drilling analytics, GIS/mapping, rig performance analyses, etc.) | 2-4 TB/day |
| Energy (oil refinery) | Fiber optic pressure and strain sensors, valve, IR cameras, thermal and electrochemical sensors | 0.5-1 Gbit/sec | 40-300 TOPS (predictive analytics, equipment performance and monitoring, oil quality grading, etc.) | 5-10 TB/day |
| Logistics, Agriculture (autonomous vehicles) | 5-10 cameras, 4-6 radar, 2-4 lidar, 10-18 ultrasonic, GPS, INS/IMU, odometry | 2-50 Gbit/sec | 150-800 TOPS (navigation, real-time obstacle detection, path and route planning, localization and mapping/SLAM, etc.) | 1-22 TB/hour (~0.8 TB/hour stored) |
| Media and Entertainment (security camera network, AR/VR) | 500-1200 IP cameras (panoramic, fisheye, IR/night vision, motion detection) | 0.6-1.4 Gbit/sec | 80-400 TOPS (real-time object detection and tracking, activity recognition, event classification, crowd analyses, etc.) | 270-630 GB/hour |
| Manufacturing (aviation, warehouse automation, robotics) | Cameras, stereo and depth sensors, F/T sensors, position and angle sensing, odometry | 0.5-2 Gbit/sec (per workcell or robot) | 50-200 TOPS per workcell/robot (object detection, barcode scanning, pick and place, sortation, inspection, manipulation, palletization/depalletization, etc.) | 0.25-1 TB/hour |
| Retail and Supply Chain (logistics, last mile, fulfillment) | POS, cameras, RFIS, WiFi positioning, IPS | 0.5-2 Gbit/sec | 30-80 TOPS (real-time customer analytics, personalization and recommendation, inventory management and replenishment, shrinkage, etc.) | 0.1-0.5 TB/hour |
| Sustainability | Energy monitors, infrared cameras, temperature and current sensors, flow meters | 0.1-1 Gbit/sec | 10-40 TOPS (real-time energy usage monitoring, energy management, distributed power generation and storage, automated controls, predictive maintenance, etc.) | 0.5 TB/day |

TABLE 1-continued

Example use case scenarios and corresponding compute requirements and parameters for various AI and ML applications at the edge.

| Industry | Sensors | Bandwidth | Compute (AI/ML) Applications | Storage |
| --- | --- | --- | --- | --- |
| Healthcare | Wearable ECG and BP monitors, glucometers, biosensors, fitness trackers, cameras | 0.1-1 Gbit/sec | 20-50 TOPS (real-time health monitoring, personalized care, predictive health analytics, privacy and security of healthcare apps) | 0.5 TB/day |

Figure 3:
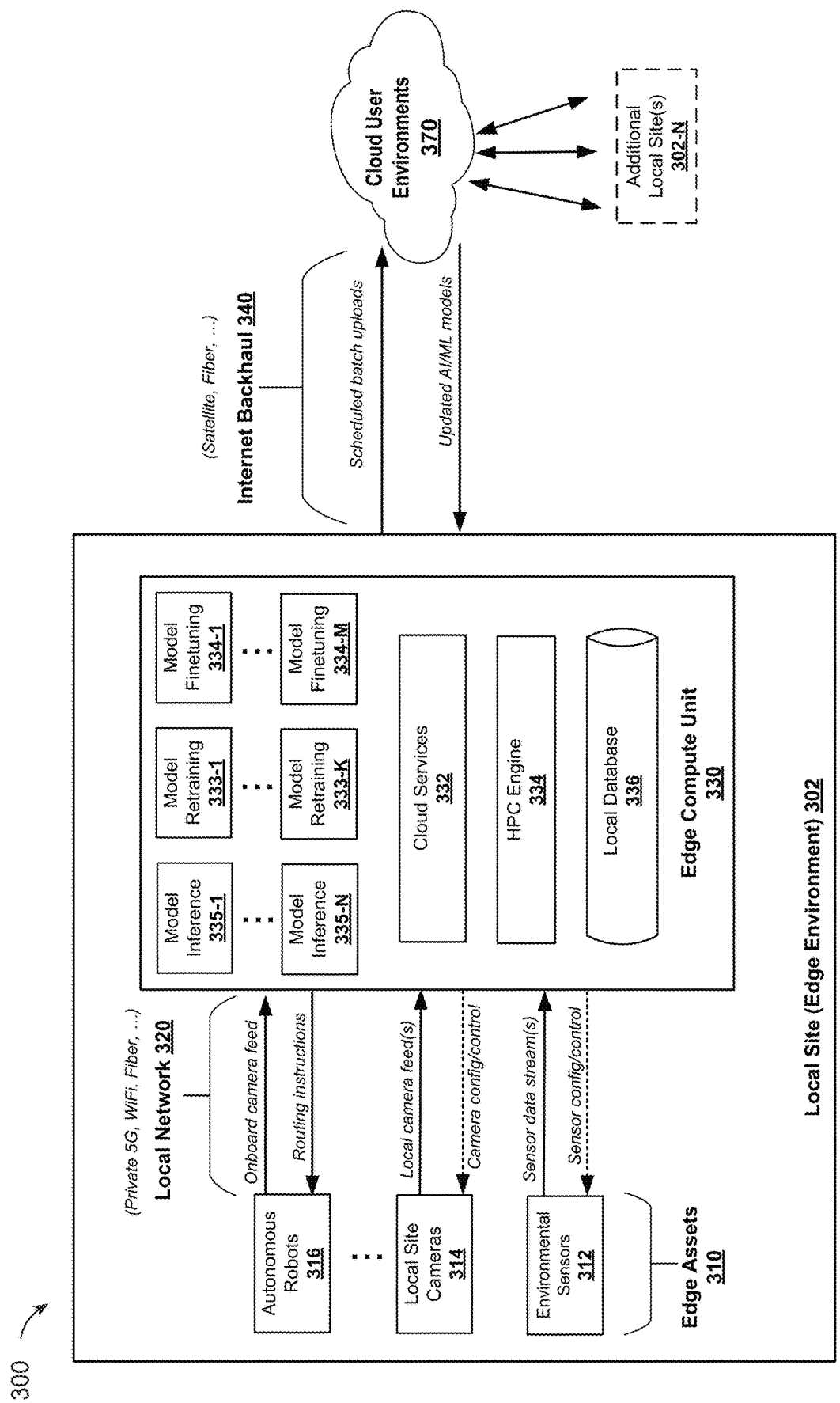
FIG. 3 is a diagram illustrating an example of an edge computing system for statistical processing, machine learning (ML) and/or artificial intelligence (AI) workloads, where the edge computing system includes one or more local sites each having one or more edge compute units, in accordance with some examples.

FIG. 3 is a diagram illustrating an example of an edge computing system 300 that can be used to implement or perform one or more aspects of the present disclosure. For example, the systems and techniques for real-time search and retrieval of streaming sensor data can be performed at a local edge site (e.g., edge environment) 302, using one or more edge compute units 330. In some embodiments, the edge compute unit 330 can also be referred to as an "edge device." In some aspects, edge compute unit 330 can be provided as a high-performance compute and storage (HPCS) and/or elastic-HPCS (E-HPCS) edge device.

For example, a local site 302 can be one of a plurality of edge environments/edge deployments associated with edge computing system 300. The plurality of local sites can include the local site 302 and some quantity N of additional local sites 302-N, each of which may be the same as or similar to the local site 302. The local site 302 can be a geographic location associated with an enterprise user or other user of edge computing. The local site 302 can also be an edge location in terms of data network connectivity (i.e., edge environment 302 is both a local geographic location of an enterprise user and is an edge location in the corresponding data network topography).

In the example of FIG. 3, the edge environment 302 includes one or more edge compute units 330. Each edge compute unit 330 can be configured as a containerized edge compute unit or data center for implementing sensor data generation or ingestion and inference for one or more trained ML/AI models provided on the edge compute unit 330. For instance, edge compute unit 330 can include computational hardware components configured to perform inference for one or more trained AI/ML models. As illustrated, a first portion of the edge compute unit 330 hardware resources can be associated with or used to implement inference for a first AI/ML model 335-1, . . . , and an N-th AI/ML model 335-N. In other words, the edge compute unit 330 can be configured with compute hardware and compute capacity for implementing inference using a plurality of different AI/ML models. Inference for the plurality of AI/ML models can be performed simultaneously or in parallel for multiple ones of the N AI/ML models 335-1, . . . 335-N. In some aspects, inference can be performed for a first subset of the N AI/ML models for a first portion of time, can be performed for a second subset of the N AI/ML models for a second portion of time, etc. The first and second subsets of the AI/ML models can be disjoint or overlapping.

In some aspects, the edge compute unit 330 can be associated with performing one or more (or all) of on-premises training (or retraining) of one or more AI/ML models of the plurality of AI/ML models, performing fine-tuning of one or more AI/ML models of the plurality of AI/ML models, and/or performing instruction tuning of one or more AI/ML models of the plurality of AI/ML models. For instance, a subset of the plurality of AI/ML models that are deployed to (or are otherwise deployable to) the edge compute unit 330 may be trained or fine-tuned on-premises at the local edge site 302, without any dependence on the cloud (e.g., without dependence on the cloud-based AI/ML training clusters implemented within the cloud user environment 370). In some aspects, the edge compute unit 330 can perform the on-premises training or retraining, fine-tuning, and/or instruction tuning of the one or more AI/ML models of the plurality of AI/ML models to account for model degradation or drift over time. In some examples, the edge compute unit 330 can perform the one-premises training or retraining, fine-tuning, and/or instruction tuning of the one or more AI/ML models of the plurality of AI/ML models in order to adapt a respective AI/ML model to a new or differentiated task from which the respective model was originally trained (e.g., pre-trained).

In some cases, fine-tuning of an AI/ML model can be performed in the cloud (e.g., using the cloud-based AI/ML training clusters implemented within the cloud user environment 370), can be performed at the edge (e.g., at local edge environment 302, using edge compute unit 330 and AI/ML model finetuning 334-1, . . . , 334-M), and/or can be performed using a distributed combination over the cloud and one or more edge compute units 330. In some cases, fine-tuning of an AI/ML model can be performed in either the cloud or the edge environment 302 (or both), based on the use of significantly less compute power and data to perform finetuning and/or instruction tuning of a trained AI/ML model to a specific task, as compared to the compute power and data needed to originally train the AI/ML model to either the specific task or a broader class of tasks that includes the specific task.

In some embodiments, edge compute unit 330 can include computational hardware components that can be configured to perform training, retraining, finetuning, etc., for one or more trained AI/ML models. In some aspects, at least a portion of the computational hardware components of edge compute unit 330 used to implement the AI/ML model inference 335-1, . . . , 335-N can also be utilized to perform AI/ML model retraining 333-1, . . . , 333-K and/or to perform AI/ML model finetuning 334-1, . . . , 334-M. For example, computational hardware components (e.g., CPUs, GPUs, NPUs, hardware accelerators, etc.) included in the edge compute unit 330 may be configured to perform various combinations of model inference, model retraining, and/or model finetuning at the edge (e.g., at the local edge site 302). At least a portion of the K AI/ML models 333-1, . . . , 333-K associated with model retraining at the edge can be included in the N AI/ML models associated with model inference at the edge. Similarly, at least a portion of the M AI/ML models 334-1, . . . , 334-M associated with model finetuning at the edge can be included in the N AI/ML models associated with model inference at the edge.

In some embodiments, for a given pre-trained AI/ML model received at the edge compute unit 330 (e.g., received from the AI/ML training clusters in the cloud user environments 370), the edge compute unit 330 can be configured to perform one or more (or all) of model inference 335, model retraining 333, and/or model finetuning 334 at the edge.

As illustrated in FIG. 3, retraining for a plurality of AI/ML models can be performed simultaneously or in parallel for multiple ones of the K AI/ML models 333-1, . . . , 335-K (which as noted above can be the same as or similar to the N AI/ML models 335-1, . . . , 335-N, or may be different; and/or can be the same as or similar to the M AI/ML models 334-1, . . . , 334-M, or may be different). In some aspects, retraining can be performed for a first subset of the K AI/ML models for a first portion of time, can be performed for a second subset of the K AI/ML models for a second portion of time, etc. The first and second subsets of the K AI/ML models can be disjoint or overlapping. Additionally, or alternatively, finetuning for a plurality of AI/ML models can be performed simultaneously or in parallel for multiple ones of the M AI/ML models 334-1, . . . , 334-M (which can be the same as, similar to, or disjoint from the N AI/ML models 335 and/or the K AI/ML models 333). In some aspects, finetuning can be performed for a first subset of the M AI/ML models for a first portion of time, can be performed for a second subset of the M AI/ML models for a second portion of time, etc. The first and second subsets of the M AI/ML models can be disjoint or overlapping.

Each edge compute unit 330 of the one or more edge compute units provided at each edge environment 302 of the plurality of edge environments 302-N can additionally include cloud services 332, a high-performance compute (HPC) engine 334, and a local database 336. In some aspects, HPC engine 334 can be used to implement and/or manage inference associated with respective ones of the trained AI/ML models 335-1, . . . , 335-N provided on the edge compute unit 330.

In one illustrative example, the edge compute unit 330 can receive the trained AI/ML models 335-1, . . . , 335-N from a centralized AI/ML training cluster or engine that is provided by one or more cloud user environments 370. The AI/ML training clusters of the cloud user environment 370 can be used to perform training (e.g., pre-training) of AI/ML models that can later be deployed to the edge compute unit 330 for inference and/or other implementations at the edge environment 302. Data network connectivity between edge compute unit 330 and cloud user environments 370 can be provided using one or more internet backhaul communication links 340. For instance, the internet backhaul 340 can be implemented as a fiber communication link (e.g., wired fiber optic connectivity from the edge environment 302/edge compute unit 330 to internet infrastructure that is connectable to the cloud user environments 370; a direct or point-to-point wired fiber optic connectivity from the edge environment 302/edge compute unit 330 to the cloud user environments 370; etc.).

The internet backhaul 340 may additionally, or alternatively, be implemented using one or more satellite communication links. For instance, internet backhaul 340 can be a wireless communication link between edge compute unit 330/edge environment 302 and a satellite of a satellite internet constellation. In some aspects, it is contemplated that the edge compute unit 330 can include (or otherwise be associated with) one or more satellite transceivers for implementing satellite connectivity to and/or from the edge compute unit 330. In some aspects, the one or more satellite transceivers can be integrated in or coupled to a housing (e.g., container, in examples where edge compute unit 330 is a containerized data center) of the edge compute unit 330 and used to provide satellite connectivity capable of implementing the internet backhaul link 340. In another example, the one or more satellite transceivers can additionally, or alternatively, be provided at the edge environment 302 where edge compute unit 330 is deployed.

In some aspects, the internet backhaul link 340 between edge compute unit 330 and cloud user environments 370 can be used to provide uplink (e.g., from edge compute unit 330 to cloud user environments 370) of scheduled batch uploads of information corresponding to one or more of the AI/ML models 335-1, . . . , 335-N implemented by the edge compute unit 330, corresponding to one or more features (intermediate or output) generated by the AI/ML models implemented by edge compute unit 330, and/or corresponding to one or more sensor data streams generated by edge assets 310 provided at edge environment 302 and associated with the edge compute unit 330, etc. The internet backhaul link 340 may additionally be used to provide downlink (e.g., from cloud user environments 370 to edge compute unit 330) of updated, re-trained, fine-tuned, etc., AI/ML models. For instance, the updated, re-trained, or fine-tuned AI/ML models transmitted over internet backhaul link 340 from cloud user environments 370 to edge compute unit 330 can be updated, re-trained, or fine-tuned based on the scheduled batch upload data transmitted on the uplink from edge compute unit 330 to cloud user environments 370. In some aspects, the updated AI/ML models transmitted from cloud user environments 370 to edge compute unit 330 can be updated versions of the same AI/ML models 335-1, . . . , 335-N already implemented on the edge compute unit 330 (e.g., already stored in local database 336 for implementation on edge compute unit 330). In other examples, the updated AI/ML models transmitted from cloud user environments 370 to edge compute unit 330 can include one or more new AI/ML models that are not currently (and/or were not previously) included in the set of AI/ML models 335-1, . . . , 335-N that are either implemented on edge compute unit 330 or stored in local database 336 for potential implementation on edge compute unit 330.

In some cases, the AI/ML distributed computation platform 300 can use the one or more edge compute units 330 provided at each edge environment 302 to perform local data capture and transmission. In particular, the locally captured data can be obtained from one or more local sensors and/or other edge assets 310 provided at the edge environment 302. For instance, in the example of FIG. 3, the local edge assets/sensors 302 can include, but are not limited to, one or more autonomous robots 316, one or more local site cameras 314, one or more environmental sensors 312, etc. The local sensors and edge assets 310 can communicate with the edge compute unit 330 via a local network 320 implemented at or for edge environment 302.

For instance, local network 320 can be used to provide one or more communication links between the edge compute unit 330 and respective ones of the edge assets 310. In one illustrative example, local network 320 can be implemented as a private 5G, 4G, LTE, or other private cellular network; can be implemented as a public 5G or other public cellular network; can be implemented as a WiFi, Bluetooth, Zigbee; Z-wave; Long Range (LoRa), Sigfox, Narrowband-IoT (NB-IoT), LTE for Machines (LTE-M), IPV6 Thread, or other short-range wireless network; can be implemented as a local wired or fiber-optic network; etc. As illustrated in the example of FIG. 3, the edge compute unit 330 can receive different types of data from different ones of the edge assets/sensors 310 and can transmit different types of configurations/controls to different ones of the edge assets/sensors 310. For instance, the edge compute unit 330 can receive onboard camera feed and other sensor information (including 3D range scanner, LiDAR, or odometry information for Simultaneous Localization and Mapping) from the autonomous robots 316, and can transmit in response routing instructions to the autonomous robots 316. The routing instructions can be generated or otherwise determined based on processing the onboard camera feed data from the autonomous robots 316 using an appropriate one (or more) of the trained AI/ML models 335-1, . . . , 335-N implemented on the edge compute unit 330 and/or using the HPC engine 334 of the edge compute unit 330.

In another example, the edge compute unit 330 can receive local camera feed(s) information from the local site cameras 314 and can transmit in response camera configuration and/or control information to the local site cameras 314. In some cases, the edge compute unit 330 may receive the local camera feed(s) information from the local site cameras 314 and transmit nothing in response. For instance, the camera configuration and/or control information can be used to re-position or re-configure one or more image capture parameters of the local site cameras 314—if no re-positioning or image capture parameter reconfiguration is needed, the edge compute unit 330 may not transmit any camera configuration/control information in response. In some aspects, the camera configuration and/or control information can be generated or otherwise determined based on processing the local camera feed data from the local site cameras 314 using an appropriate one (or more) of the trained AI/ML models 335-1, . . . , 335-N implemented on the edge compute unit 330 and/or using the HPC engine 334 of the edge compute unit 330.

In another example, the edge compute unit 330 can receive environmental sensor data stream(s) information from the environmental sensors 312 and can transmit in response sensor configuration/control information to the environmental sensors 312. In some cases, the edge compute unit 330 may receive the sensor data streams information from the environmental sensors 312 and transmit nothing in response. For instance, the sensor configuration and/or control information can be used to adjust or re-configure one or more sensor data ingestion parameters of the environmental sensors 312—if no adjustment or re-configuration of the environmental sensors 312 is needed, the edge compute unit 330 may not transmit any sensor configuration/control information in response. In some aspects, the sensor configuration and/or control information can be generated or otherwise determined based on processing the local environmental sensor data streams from the environmental sensors 312 using an appropriate one (or more) of the trained AI/ML models 335-1, . . . , 335-N implemented on the edge compute unit 330 and/or using the HPC engine 334 of the edge compute unit 330.

In some examples, the systems and techniques described herein can be used to drive local storage, inference, prediction, and/or response, performed by an edge compute unit (e.g., edge compute unit 330) with minimal or no reliance on cloud communications or cloud offloading of the computational workload (e.g., to cloud user environments 370). The edge compute unit 330 can additionally be used to locally perform tasks such as background/batch data cleaning, ETL, feature extraction, etc. The local edge compute unit 330 may perform inference and generate prediction or inference results locally, for instance using one or more of the trained (e.g., pre-trained) AI/ML models 335-1, . . . , 335-N received by edge compute unit 330 from cloud user environments 370. The local edge compute unit 330 may perform further finetuning or instruction tuning of the pre-trained model to a specified task (e.g., corresponding one or more of the AI/ML model finetuning instances 333-1, . . . , 4333-M, as described previously above).

The prediction or inference results (and/or intermediate features, associated data, etc.) can be compressed and periodically uploaded by edge compute unit 330 to the cloud or other centralized location (e.g., such as cloud user environments 370 etc.). In one illustrative example, the compressed prediction or inference results can be uploaded to the cloud via a satellite communication link, such as a communication link to a satellite internet constellation configured to provide wireless satellite connectivity between the edge compute unit and existing terrestrial internet infrastructure. For instance, the compressed prediction or inference results can be included in the scheduled batch uploads transmitted over internet backhaul link 340 from edge compute unit 330 to cloud user environments 370. In some cases, the prediction or inference results can be utilized immediately at the edge compute unit 330, and may later be transmitted (in compressed form) to the cloud or centralized location (e.g., cloud user environments 370). In some aspects, satellite connectivity can be used to provide periodic transmission or upload of compressed prediction or inference results, such as periodic transmission during high-bandwidth or low-cost availability hours of the satellite internet constellation. In some cases, some (or all) of the compressed prediction or inference results can be transmitted and/or re-transmitted using wired or wireless backhaul means where available, including fiber-optic connectivity for internet backhaul, etc.

Notably, the systems and techniques can implement the tasks and operations described above locally onboard one or more edge compute units 330, while offloading more computationally intensive and/or less time-sensitive tasks from the edge compute unit to AI/ML training clusters in the cloud user environments 370. For instance, the AI/ML training clusters can be used to provide on-demand AI/ML model training and fine tuning, corresponding to the updated AI/ML models shown in FIG. 3 as being transmitted from cloud user environments 370 to edge compute unit 330 via internet backhaul 340. In some aspects, the AI/ML training clusters can implement thousands of GPUs or other high-performance compute hardware, capable of training or fine-tuning an AI/ML model using thousands of GPUs for extended periods of time (e.g., days, weeks, or longer, etc.). In some aspects, AI/ML training clusters can additionally, or alternatively, be used to perform on-cloud model compression and optimization prior to transmitting data indicative of the trained AI/ML models 335-1, . . . , 335-N to the edge compute unit 330 for local implementation using the sensor data generated by the associated edge assets 310. In some embodiments, the edge compute unit 330 can be configured to perform a scheduled or periodic download of fresh (e.g., updated or new) AI/ML models from AI/ML training clusters 370 via the internet backhaul link 340 (e.g., the updated or new AI/ML models can be distributed from AI/ML training clusters in the cloud user environments 370 to edge compute unit 330 in a pull fashion). In other examples, the updated or new AI/ML models can be distributed from AI/ML training clusters in the cloud user environments 370 to edge compute unit 330 in a push fashion, wherein the AI/ML training clusters 370 transmit the updated or new models to the edge compute unit 330 via internet backhaul link 340 as soon as the updated or new AI/ML model becomes available at the AI/ML training clusters.

Training the AI/ML models 335-1, ..., 335-N may require massive amounts of data and processing power, which can be more efficiently implemented at the cloud user environments 370 (and shared across the plurality of edge environment 302-N edge compute units 330) rather than implementing individually at each of the edge environments 302-N and corresponding edge compute unit(s) 330. In some aspects, the quality of an AI/ML model can be directly correlated with the size of the training and testing (e.g., validation) data used to perform the training and subsequent finetuning. Furthermore, in many cases, training large AI/ML models requires running thousands of GPUs, ingesting hundreds of terabytes of data, and performing these processes over the course of several weeks. Accordingly, in many cases, large-scale ML/AI model training is suited best for cloud or on-premises infrastructure and sophisticated MLOps. For instance, the training dataset associated with training a large-scale AI/ML model can be on the order of hundreds of TB-tens of petabytes (PB), or even larger. Thousands of GPUs and hours to weeks of training time can be needed, with the resulting size of the uncompressed, trained model exceeding hundreds or thousands of GB.

ML or AI inference (e.g., inference using a trained ML or AI model), on the other hand, can be implemented using far fewer resources than training, and may performed efficiently at the edge (e.g., by edge compute unit(s) 330 associated with the local site(s) 302 or 302-N). Indeed, in many cases, edge inferencing will provide better latency than cloud inferencing, as input sensor data generated at the edge (e.g., using edge assets 310) does not need to transit over an internet backhaul link 340 to the cloud region (e.g., cloud user environments 370 associated with the AI/ML training clusters) before inference can begin. Accordingly, it is contemplated herein that the trained AI/ML models 335-1, ..., 335-N can be created and trained in the cloud (e.g., at AI/ML training clusters implemented within the cloud user environment 370), and additionally can be optimized and compressed significantly, enabling the systems and techniques described herein to distribute the optimized, compressed, and trained AI/ML models 335-1, ..., 335-N to the edge locations associated with local sites 302 and corresponding edge compute unit(s) 330 where the optimized, compressed, and trained AI/ML models will be implemented for inferencing at the edge using local sensor data from edge assets 310. As noted previously above, in some aspects, one or more of the trained models (e.g., one or more of the trained AI/ML models 335-1, ..., 335-N deployed to the edge compute unit 330 for local edge inference) can be fine-tuned or instruction tuned to specific tasks, a technique which requires significantly less data and compute than their training. For instance, a trained (e.g., pre-trained) AI/ML model can be fine-tuned or instruction tuned to specific tasks including new and/or differentiated tasks relative to the task(s) originally or previously corresponding to the trained model. In some examples, a trained (e.g., pre-trained) AI/ML model can be fine-tuned or instruction tuned to specific tasks using one or more of the model retraining instances 333-1, ..., 333-K and/or using one or more of the model finetuning instances 334-1, ..., 334-M implemented locally by the edge compute unit 330, as also described previously above.

For instance, the edge compute unit 330 can use one or more of the trained AI/ML models 335-1, ..., 335-N to perform edge inferencing based on input data comprising the locally/edge-generated sensor data streams obtained from the edge assets 310 provided at the same edge environment 302 as the edge compute unit 330. In some aspects, the input data set for edge inferencing performed by edge compute unit 330 can comprise the real-time data feed from edge assets/sensors 310, which can be between tens of Mbps to 10s of Gbps (or greater). The edge compute unit 330 can, in at least some embodiments, include 10s of GPUs for performing local inferencing using the trained AI/ML models 335-1, ..., 335-N. By performing local inferencing at edge compute unit 330, an inference response time or latency on the order of milliseconds (ms) can be achieved, significantly outperforming the inference response time or latency achievable using cloud-based or on-premises remote inferencing solutions.

In some aspects, the systems and techniques can be configured to implement a continuous feedback loop between edge compute unit(s) 330 and AI/ML training clusters in the cloud user environments 370. For instance, the continuous feedback loop can be implemented based on using the edge compute unit(s) and associated edge assets/sensors 310 to capture data locally, perform inference locally, and respond (e.g., based on the inference) locally. The edge compute unit(s) 330 can be additionally used to compress and transmit features generated during inference from the source data and/or to compress and transmit inference results efficiently to the AI/ML training clusters in the cloud user environments 370 (among other cloud or on-premises locations). In the continuous feedback loop, training and fine-tuning can subsequently be performed in the cloud, for instance by AI/ML training clusters and using the batch uploaded sensor data and/or features uploaded by the edge compute unit(s) 330 to AI/ML training clusters. Based on the training and fine-tuning performed in the cloud by the AI/ML training clusters, new or updated AI/ML models are distributed from the AI/ML training clusters back to the edge (e.g., to the edge compute unit(s) 330 and local site(s) 302). This continuous feedback loop for training and fine-tuning of AI/ML models can be seen to optimize the usage of cloud, edge, and bandwidth resources. The same AI/ML model may be finetuned across multiple edge nodes to optimize the usage of available compute at the nodes and the cloud. For instance, an AI/ML model can be finetuned across a set of edge nodes comprising at least the edge compute unit 330 and one or more edge compute units included in the additional local edge sites 302-N. In some cases, the distributed finetuning of an AI/ML model across multiple edge nodes can be mediated, supervised, and/or controlled, etc., by the AI/ML training clusters implemented within the cloud user environment 370 (e.g., or various other cloud entities). In some examples, the distributed finetuning of an AI/ML model across multiple edge nodes can be supervised and/or controlled, etc., by a selected one or more edge nodes of the set of edge nodes associated with the distributed finetuning of the model. In one illustrative example, distributed finetuning or retraining of an AI/ML model across multiple edge nodes can be orchestrated by a respective fleet management client that is implemented at or by each of the multiple edge nodes.

Figure 4:
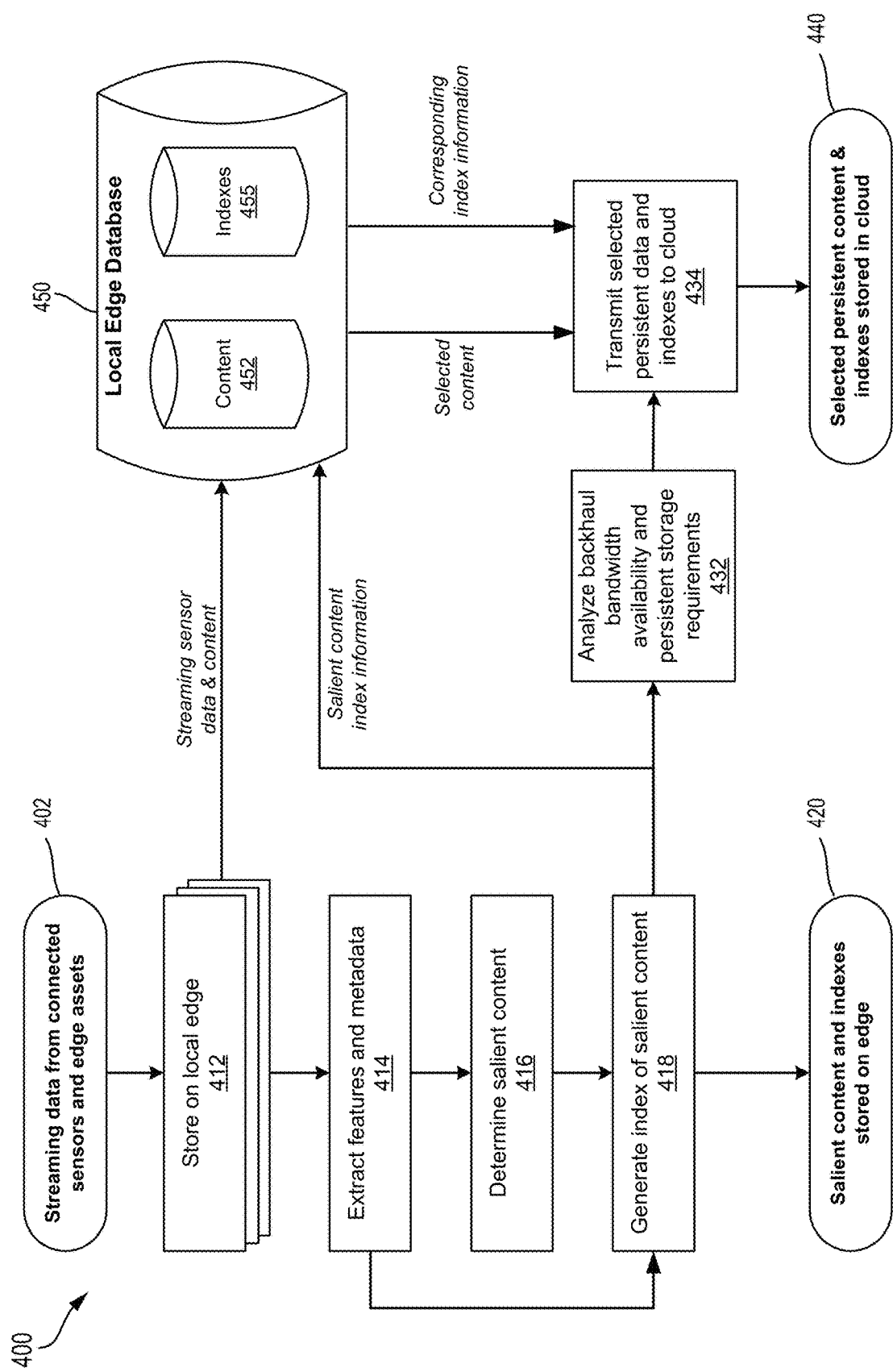
FIG. 4 is a diagram illustrating an example of content storage and indexing that can be performed at the edge (e.g., by an edge computing system or device, and/or at an edge location), in accordance with some examples.

FIG. 4 is a flow diagram illustrating an example of a content storage and indexing process 400 that can be performed at the edge (e.g., by an edge computing system or device, and/or at an edge location), in accordance with some examples. For instance, the content storage and indexing process 400 can be performed by an edge compute unit or HPCS edge device, including the edge compute unit 330 of FIG. 3.

The content storage and indexing process 400 can be implemented at the edge and performed for streaming sensor data and/or streaming content generated, obtained, or otherwise ingested or made available at the edge. For instance, content storage and indexing process 400 can be performed using streaming data 402, which can be generated by and/or obtained from one or more connected sensors and/or edge assets associated with the edge device. For example, the streaming data 402 can be sensor data obtained from (e.g., streamed from) one or more of the edge assets 310 of FIG. 3 to the edge compute unit 330 of FIG. 3. In some embodiments, the context storage and indexing process 400 can be implemented for various different types of streaming data 402.

For instance, streaming data 402 can include corresponding data generated by various sensors, which can include (but are not limited to), one or more of cameras and video cameras, multispectral and hyperspectral cameras, infrared or thermal cameras, stereo cameras, document scanners, 3D scanners, 3D range scanners, LiDARs, RADARs, accelerometers, gyroscopes, vibrometers, inertial measurement units, inertial navigation systems, GPS, microphones, and other acoustic devices, ultrasonic devices, barcode scanners, IoT sensors and devices, etc. Data generated by different sensors can be represented as different data or content streams within the streaming data 402. Different types or modalities of sensor data/content may also be represented as discrete data or content streams within the streaming data 402. In some aspects, a single sensor may generate one or more data streams that are included within the streaming data 402. For instance, a video camera can be configured to generate a first data stream comprising a series of video frames and a second data stream comprising a series of audio data. It is also possible that the various outputs of a given sensor or edge asset can be combined into a single data/content stream within the streaming data 402. A given data/content stream within the streaming data 402 may also include data corresponding to multiple different sensors.

Connected edge sensors and/or other assets can generate content (e.g., streaming data) that registers or is otherwise indicative of objects, activities, events, etc., within the surrounding environment. The generated content can additionally, or alternatively, be indicative of various environmental parameters detected for and within the surrounding environment. As used herein, the terms "data" and "content" may be used interchangeably (e.g., streaming data can be used interchangeably with streaming content, etc.).

Much of the content generated by connected edge sensors and other edge assets is in the form of raw data, such as text data or reports, images, 3D point clouds or meshes, videos, audio, geolocations or location information, etc. In many existing approaches to edge computing, the data or content generated at the edge must be transmitted to the cloud or other centralized location (e.g., data center, on-premises location, etc.) for processing. In particular, storage of the edge data content for purposes of search and retrieval is indexed and performed in the cloud and is not implemented on the edge device. For instance, in many cases, an edge device may act as a relay between the edge sensors/assets and the cloud compute resources that are actually used to process, index, store, etc., the collected edge data content. In such examples, sensor data or other content generated by edge assets can be ingested by the edge device. However, in transmitting the edge data content to the cloud, the edge device is typically configured to forward the data without implementing or providing any local (e.g., edge) long-term storage of the forwarded data.

The existing approach of transmitting edge data to the cloud for processing can be associated with various limitations and challenges. For example, transmitting the edge data to the cloud for processing can result in increased latency (corresponding to a round trip time of approximately [edge-cloud uplink time/latency]+[cloud processing time]+[cloud-edge downlink time/latency]) between the edge device first obtaining the raw sensor data/content and the final processed results from the raw sensor data/content becoming available at some later time. For instance, the increased latency associated with a hybrid edge-cloud approach in which processing of edge data is offloaded to the cloud can make it difficult or impossible to achieve substantially real-time indexing, search, and/or retrieval of streaming sensor data from the edge—particular as the number of edge locations served by cloud increases.

The existing approach of offloading the processing of edge data to the cloud can be additionally associated with high bandwidth requirements, due to the requirement of transmitting the raw sensor data in full from the edge to the cloud. High-bandwidth requirements may be present at multiple stages of a conventional indexing, search, and retrieval process that is performed in the cloud for edge data from one or more edge locations/environments.

For example, a first bandwidth is required for the transmission of the raw sensor data to the cloud to be indexed and/or otherwise processed. While this first bandwidth may be reduced by transmitting only a portion of the raw sensor data ingested or generated at the edge device, such an approach typically reduces the quality of the resulting searchable index, for the simple reason that the portion of sensor data that is not transmitted from the edge to the cloud will not be indexed, and therefore will not be made searchable or retrievable based on a query.

As such, there is a need for systems and techniques that can be used to implement indexing of streaming edge data or content with a reduced bandwidth between an edge device and a cloud or other centralized compute location. There is a further need to reduce the edge-to-cloud bandwidth without diminishing the scope or comprehensiveness of the resulting index that is generated (e.g., a need to reduce the edge-to-cloud bandwidth while still indexing the desired edge data streams in their entirety).

In the existing approach of offloading the processing of edge data to the cloud, a second bandwidth may be required to perform a local search or query of the cloud-hosted index from the edge. For instance, the index can be generated in the cloud from the sensor data/content forwarded from the edge device—if the index is stored in the cloud without being transmitted back to the edge, then a query received at the edge must be forwarded to the cloud for processing against the constructed index. Transmitting queries from the edge to the cloud (and receiving query results sent from the cloud to the edge) consumes the second bandwidth. Moreover, if data network connectivity between the edge and the cloud is disrupted or degraded, so too will the edge user's ability to query the index be likewise disrupted or degraded. Even if the index is generated in the cloud and transmitted back to the edge for local storage, the second bandwidth may still be consumed when the edge user wishes to view relevant pieces of data/content that are identified based on a query of the index, as the relevant data/content requested by the edge user will be transmitted from a cloud data store to the edge device.

As such, there is also a need for systems and techniques that can be used to implement search and retrieval of streaming sensor data while utilizing a reduced bandwidth between an edge device and a cloud or other centralized compute location. In at least some cases, there is a need for systems and techniques that can be used to implement search and retrieval of indexed streaming sensor data without utilizing cloud connectivity, cloud compute, or cloud storage. As noted above, the limitations associated with offloading processing from the edge device to the cloud or other centralized compute entity can negatively impact the indexing, the search, and the retrieval of the streaming sensor data/content ingested at the edge, as each of the three are made available only after the content is stored in the cloud. There is a still further need for systems and techniques that can be used to implement substantially real-time search and retrieval of streaming sensor data ingested at the edge, for instance based on reducing or eliminating latency associated with data transmission from the edge to the cloud, and vice versa.

As noted previously above, in one illustrative example, the process 400 of FIG. 4 can be implemented by a high-performance compute and storage (HPCS) edge device, which can be the same as or similar to the edge compute unit 330 of FIG. 3. As disclosed herein, the use of the HPCS edge device to perform indexing, search, and/or retrieval of streaming sensor data and/or streaming content at the edge can be seen to address the challenges described above associated with the conventional cloud-based approach.

In particular, the HPCS edge device can be configured to process edge data/content in-situ, with minimal latency or delay between the time that the edge data is generated or ingested to the edge device and the time at which corresponding index information is made available for the search and/or retrieval of the ingested edge data. For example, the streaming data 402 can be ingested or otherwise received at the edge device, and at block 412 can be stored on the local edge. In some embodiments, storing the streaming data 402 on the local edge can comprise storing the streaming sensor data 402 in one or more local edge database 450. In some aspects, the streaming data 402 can be stored in a content portion 452 of the local edge database 450, which can be separate from or combined with an indexes portion 455 used to store corresponding indexing information for the content 452.

At block 414, the edge device can analyze the streaming data 402 (e.g., the stored content 452 from the local edge database 450 content 452, and can extract or otherwise generate one or more features, embeddings, and/or metadata information for respective portions or streams included in the streaming data 402. For instance, the streaming data 402/stored content 452 can be analyzed, processed, and indexed locally at the edge at block 414, with the indexing based on one or more features/embeddings generated using the streaming data 402/stored content 452 and/or based on metadata information associated with or extracted from the streaming data 402/stored content 452.

Local (e.g., edge) search and retrieval applications may require repeated access to the same content (e.g., content that is searched or retrieved repeatedly over time). In some aspects, local search and retrieval applications that required repeated access to the same content can become faster based on performing local indexing at the edge at block 414 of the real-time search and retrieval process 400, as the extracted features, embeddings, and metadata (e.g., also referred to as "index information" or "indexing information") are stored locally and available without network latency.

In some embodiments, at block 414, the edge device can be configured to analyze the streaming data 402/content 452 in-situ and in substantially real-time (or near-real-time). Based on the analysis, the edge device can generate or otherwise determine one or more tags for each piece of data/content, as will be described in greater detail below.

The one or more corresponding tags generated for each piece of data/content can be used to generate an inverse index corresponding to some, or all, of the respective pieces of data/content stored in the local edge content database 452.

An inverse index may also be referred to as an inverted index. An inverse or inverted index is a data structure that can be used to make full document, data, or file searches more efficient in a database. An inverse index can be used to achieve fast full-file searches, based on performing increased pre-processing at the time of indexing each file that is added to the searchable database. For example, consider the scenario in which an inverse index is to be built over text documents (although it is noted that inverse indexes can be built for various other files, file types, documents, data or content streams, data structures, etc.). An inverted index for a database of text documents can contain a listing of the corpus of all unique words that appear in any document of the database. For each word in the corpus of the inverted index, the inverted index further contains a corresponding listing of all the documents in which the word appears.

In some examples, an inverse index can be generated based on performing tokenization for each input file or document, to break the input down into sub-portions or component blocks. In the example of an inverse index over a plurality of text documents, each text document can be parsed or tokenized on a word-by-word basis. After tokenization, each unique token extracted from the documents is used as a key in an index. The corresponding key values stored in the index are the listing of the respective documents (e.g., the respective document IDs) where the particular token (e.g., unique word) appears. In some examples, the inverse index can further include occurrence frequency information, such that the corresponding key values of the index indicate the document IDs where a unique token (e.g., word) appears and further indicate the number of times that the unique token appears in each of the listed documents.

Search and retrieval based on an inverse index can be performed quickly and efficiently. For example, when a search or query is received, the query data can be parsed in a manner that is the same as or similar to that which was used to parse or tokenize the documents represented in the inverse index. More generally, the query can be parsed, processed, analyzed, etc., to extract or generate from the query one or more tokens that can be checked against the unique tokens that key the inverse index. The tokenized query representation can be compared against the unique tokens (e.g., keys) of the inverse index, and the query results can be determined based on specified matching parameters (e.g., exact match, similar or most similar match, relevance, salience, minimizing difference or distance between token representations, etc.). Each unique token/key of the inverse index that is identified as a potential match or potentially relevant to the received query can be associated with one or more document IDs where the unique token appears. Accordingly, the content retrieval can be performed based on retrieving some (or all) of the document IDs listed in the inverse index for the unique tokens/keys of the inverse index that are identified as relevant during the search/query process.

Returning to the discussion of FIG. 4, at block 414 the process can further include using the extracted features and metadata to "tag" each piece of streaming data/content that is received. Tagging a piece of streaming data/content can comprise associating a corresponding document ID of the piece of streaming data/content with one or more of the extracted features or metadata.

The information used to tag each piece of streaming data/content can be used to key the inverse index for the local edge content 452. Streaming data/content can have one tag and/or can have a plurality of different tags. In one illustrative example, the streaming data/content can be tagged (and indexed in the inverse index) based on corresponding features generated based on providing the streaming data/content as input to a machine learning (ML) or artificial intelligence (AI) model, network, algorithm, etc.

For instance, the corresponding features used to tag sensor data or content can include one or more feature vectors generated by a machine learning classifier, encoder, autoencoder, etc. The feature vectors can also be referred to as "extracted features." In some aspects, the extracted features can be output features or output embeddings generated by an ML/AI classification model. In some examples, the extracted features may additionally, or alternatively, be intermediate (e.g., non-output) features or intermediate (non-output) embeddings generated by intermediate layers of an ML/AI classification model.

The extracted features (e.g., feature vectors) generated at block 414 can be generated as relatively high-dimensional data (e.g., n-dimensional feature vectors) that represents a given piece of sensor data/content. The structure and/or dimensionality of the generated feature or embedding vectors can vary, based on factors such as the type of ML model used for feature extraction, the type of sensor or type/format of the input data provided to the ML model, etc. In general, the various combinations of these factors can be referred to as different "modes" or "modalities."

In one illustrative example, performing feature extraction at block 414 can comprise performing multi-modal feature extraction. For instance, based on the modality of a given sensor data being processes, an appropriate or corresponding ML model can be used to generate the features from the given sensor data. Different ML models can generate different types of feature vectors (or other feature representations) for different types of data and modalities. For example, an autoencoder-based neural network can include hidden layers that correspond to a compressed representation of the input data provided to the network—in some cases, the compressed hidden layer representations can be used as extracted features for indexing the sensor data/content.

In another example, in the context of image processing, a CNN may be used to generate a feature map for an input image (e.g., a still image, a frame of video data, etc.). A feature map may be generated at each convolutional layer of the CNN. In some aspects, the convolutional layer feature maps can be used as extracted features for indexing the sensor data/content. Fully connected layers within the image-processing CNN can generate a feature vector output or feature map that represents the original input image as a whole, and this may also be used as an extracted feature for indexing image-based sensor data/content.

In still another example, an RNN or transformer can be used for natural language processing, and may generate feature vectors for words or tokens in the text-based input sequence. In such examples, each feature vector corresponding to a word or token may be used for the indexing at block 414 of process 400. In some examples, it is additionally, or alternatively, possible to generate extracted features corresponding to larger sequences of the text-based inputs, up to and including each text-based input as a whole.

In some cases, the feature extraction at block 414 can additionally be used to generate one or more embeddings corresponding to features of the input sensor data/content.

Embeddings are representations of features of a piece of content (e.g., in an image, video, text document, audio clip, etc.). In particular, embeddings can be generated to represent relatively high-dimensionality features in a lower-dimensional vector space. Embeddings can be used to capture the underlying relationships and characteristics of the content in a way that facilitates effective search, retrieval, or matching of two (or more) given pieces of content. Embeddings can be generated based on mapping the higher-dimensional data into a lower-dimensional space. For instance, one or more neural networks and/or dimensionality reduction techniques can be used to generate one or more embeddings corresponding to the data being indexed (e.g., the streaming data 402 and/or the stored content 452 at the edge). The resulting embedding vectors are dense and continuous, and represent the essential properties of the original piece of content. Accordingly, the extracted features used for indexing (e.g., inverse indexing) of streaming sensor data and streaming content at the edge can, in at least some embodiments, include embeddings generated for the input streaming data 402.

In one illustrative example, the extracted features generated at block 414 (and used in block 416 to determine salient content and/or used at block 418 to generate an index of the salient content) can be generated using a comprehensive and consistent embedding space that is shared across the various ML models/networks and/or different data modalities. For instance, by generating the extracted features using a shared embedding space, the systems and techniques can support unified indexing, search and retrieval in a multi-modal implementation that spans the different types of sensor data and content 402 being ingested at the edge. In some aspects, a multi-modal implementation can be provided based on using one or more translation layers between modalities (e.g., to translate features/embeddings from a first modality to a second modality, or to translate features/embeddings from a first modality to the shared embedding space, etc.). For example, in the context of transformer-based architectures or implementations, the respective modality-specific translation layers can be implemented using corresponding attention heads within the transformer layers.

At block 416, the process 400 can include determining salient content represented within the streaming data and content 402/stored local edge content 452. For instance, the salient content can be determined based at least in part on using the extracted features and metadata from block 414 and described above.

In some embodiments, determining the salient content can include identifying relevant patterns or anomalies across a network of multiple sensors (either multimodal or homogenous) that are registering the same object or event. Such an approach can be used to achieve more reliable and robust search and retrieval of information in downstream uses of the presently disclosed real-time search and retrieval pipeline. For instance, a piece of retrieved information returned for a search query can be more reliable based on using the multiple sensor data streams (and extracted features thereof) to corroborate the object or event represented in the retrieved information.

In other words, when an object or event is represented in multiple sensor data streams, corroboration or validation of the object or event as salient can happen during the index construction process itself, rather than waiting to implement corroboration or validation as a ranking metric at the later time of the search and retrieval steps. In this approach, salient data identified at block 416 includes the data/content indicative of an object or event that has been successfully corroborated by one or more other sensor data streams. Notably, the salient information identified at block 416 proceeds to index generation 418 and storage at the edge in block 420.

Meanwhile, the portion of streaming data/content 402 that is not identified as salient information in block 416 can be removed or withheld from proceeding to the index generation 418 and storing on the edge at block 420. In some examples, content identified as not comprising salient information at block 416 may be streaming sensor data or streaming content that is determined to be inconsistent and/or anomalous. For instance, streaming sensor data can be obtained from multiple cameras each providing different perspective views of an oil well cover. Features and/or embeddings can be generated for the video frames obtained from each camera (at block 414) and can be analyzed for salient content (at block 416).

Salient content or information in the context of this example may be the presence of unknown or unexpected objects, entities, etc., and/or the occurrence of various events. For example, the presence of a crack in the oil well cover can be identified as a salient feature within the streaming camera data, and can be identified based on using one or more ML models to analyze the features corresponding to each streaming camera data feed. Other salient information in the context of this example could include foreign objects on or near the oil well cover, unknown or unauthorized individuals appearing in the frame of the camera, etc. If a first camera feed (corresponding to a first perspective of the oil well cover) is analyzed and the extracted features indicate that the video frames may be classified as containing a crack, a comparison or validation can be performed to validate the seemingly salient information from the first camera feed with some (or all) of the remaining camera feeds of the same oil well cover (in addition to any other sensor or edge data that is available and also corresponds to the same oil well cover, e.g., being either the same video-based modality as the camera feeds or being a different modality entirely).

If a pattern is identified over the multiple camera feeds that correspond to the same oil well cover—such as a pattern of the corresponding camera feeds from the different cameras each indicating some classification probability of a crack being present in the oil well cover, the potential crack can be identified at block 416 as a salient feature and can proceed to block 418 for indexing as such within the inverse index information being constructed at the edge.

If a pattern is not identified over the multiple camera feeds that correspond to the same oil well cover (e.g., the first camera feed indicates the potential crack, but second, third, and fourth cameras do not indicate any potential crack), then the potential crack from the first camera feed stream can be identified as non-salient information at block 416, and withheld from indexing at block 418 and storing locally at the edge at block 420.

In another illustrative example of the salience analysis of block 416, consider a scenario in which image and video data are streamed from respective RGB and thermal cameras onboard one or more drones inspecting a bridge. Both streams of data (e.g., RGB camera data and thermal camera data) can be processed on premises at the edge, for instance by streaming the camera data to the edge compute unit 330 of FIG. 3 and using edge compute unit 330 to perform the process 400 of FIG. 4. In particular, the RGB and thermal camera data streams can be processed using the process 400, in-situ at the edge, and a suite of region-based convolutional neural networks (CNNs) can be used to perform one or more of the feature extraction 414 and/or the salient content determination 416. For instance, the CNNs can be used to detect or classify defects, such as cracks and fissures, in both the RGB and thermal camera data streams. In some aspects, only those defects that are consistent across both modalities of data are identified as salient information at block 416, and are subsequently indexed at block 418 and stored locally at the edge at block 420. For instance, defects that are consistent across the two modalities of data can be indexed and stored for retrieval onsite (e.g., at the edge). In one illustrative example, a civil engineer, inspector, or other user can query the locally stored images or video frames using a query to the local edge database 450 and/or a query to the salient content and indexes 420 that are stored on the edge (e.g., the salient content and indexes 420 may be the same as or different than the respective content 452 and indexes 455 shown as being stored in local edge database 450). For example, the user can query the locally stored images or video frames for potential issues such as 'corrosion,' 'seepage,' 'cracks,' 'creep,' 'carbonation,' 'shrinkage,' 'water penetration,' or various other structural anomalies.

In some aspects, the queries listed in the example above can be examples of the different tags applied to the indexed data at block 418, when the index of salient content is generated. For instance, in some embodiments it is contemplated that the index of salient content can be based on one or more tags applied to streaming data, where the one or more tags are selected from the classification space of one or more ML or AI classifiers or classification models, etc.

For example, the process 400 can be implemented based on aggregating and chunking streaming content 402 in a pre-determined time window (e.g., 1 minute, 5 minutes, 10 minutes, etc.). In some cases, the streaming content 402 can be paginated for temporary storage on the edge. Local compute at the edge (e.g., edge compute unit 330 of FIG. 3 and/or other edge device associated with implementing process 400) can be used to extract features and metadata at block 414 which are relevant for user queries on the edge. While the extracted features or embeddings may not be human interpretable, metadata tags can be directly used for generating inverted index. For example, a streaming video can be chunked into segments of 1-minute duration and tagged with metadata tags such as 'person, walking, existing aisle'; 'vehicle, speeding, 80 mph'; 'railroad crossing, person, tractor trailer, stalled'; etc., for a given segment. In some aspects, the metadata tags can be singular tags (e.g., 'person' or 'vehicle' etc.) and/or can be compound, such as in the three examples above of compound metadata tags.

The salient segments are identified at block 416, and can be identified as the metadata tagged segments having relevant tags. The salient segments are indexed and stored on the edge at block 418 and 420, respectively. In one illustrative example, a subset of the identified salient content from block 416 can be selected based on the corresponding metadata, features, and/or embeddings, and sent at block 434 for persistent storage in the cloud using backhaul connectivity from the edge (e.g., internet backhaul 340 of FIG. 3).

In some aspects, the salient content and corresponding indexes identified and generated, respectively, at block 418 can be stored locally at the edge (e.g., in local edge database 450) without being transmitted to the cloud or other centralized location. Keeping sensitive data and their corresponding indexes locally at the edge can be used to address privacy and security concerns. For instance, consider another illustrative example where the input data/content 402 comprises health or medical data such as MRIs, CT scans, X-rays, ultrasounds, PET scans, EEGs, ECGs, blood panels, psych evals, EHRs, clinician notes, etc. In such an example, the systems and techniques described herein can be used to store the health data locally (e.g., at the edge), on the premises of a healthcare provider. The index information generated at block 418 for the identified salient content can be made available for search and retrieval on the local network and/or to anyone with access to the local network. For instance, the local network can be the local edge network, the same as or similar to the local network 320 of FIG. 3 corresponding to the local site/edge environment 302 (which, in the example above, would be the healthcare provider's office).

Based on minimizing the transfer of data across the internet or other open/public networks, while making reverse indexes of salient information available locally, the systems and techniques can minimize the risk of data breaches and unauthorized access. In some aspects, search requests of the reverse index of salient information can be restricted to the local edge network or from identified external sites.

In some examples, search requests of the inverse index of salient information can be provided for one or more users or entities that are remote from the edge. For example, the systems and techniques may, in some embodiments, provide the ability to enable the search of indexed edge content in the cloud (e.g., cloud user environments 370 can, with limited permissions or applicability, search the indexed edge content generated and stored at the local site/edge environment 302 of an edge compute unit 330 implementing process 400 of FIG. 4).

In this case, the process 400 can include, at block 432, analyze backhaul bandwidth availability and persistent storage requirements to determine what data and indexes (if any) are to be transmitted to the cloud. In some cases, block 432 can be used to identify the edge data and indexes that should be sent to the cloud for cloud storage as persistent data and indexes. In some cases, an identification of the persistent data and indexes to send to the cloud can exceed the backhaul bandwidth availability, in which case a lesser amount (e.g., subset) of the identified data and indexes for cloud persistence may be transmitted to the cloud.

At block 434, the identified persistent data and indexes (or subset thereof) can be sent from the edge (e.g., from the local edge database 450) to the cloud. At block 440, the identified persistent data and indexes are stored in the cloud for cloud-based search and retrieval of queried information.

In one illustrative example, the persistent content stored in the cloud at block 440 can comprise only the extracted features and/or generated embeddings corresponding to the underlying, raw sensor data streams 402. For instance, the extracted features/embeddings generated at block 414 can be sent to the cloud as a representation of the raw sensor data streams, while the raw sensor data itself does not leave the edge and is not transmitted over the internet or other public data network. In some embodiments, the embeddings for the sensor data can be transmitted to the cloud along with the corresponding inverse index information generated at the edge. A query received in the cloud can be processed against the inverse index, and the relevant content can be requested/pulled from the edge for presentation in response to the cloud query. In some aspects, the cloud query results can be indicative of the matches found in the inverse index, but raw content is not transmitted from the edge. In some aspects, the edge device at block 434 can transmit the extracted features/embeddings generated for salient data, without transmitting the inverse index generated at the edge. Using the extracted features/embeddings, the cloud can generate a cloud-based inverse index in a process the same as or similar to that described above for the edge.

In some embodiments, queries can be processed on-site where the content was generated and indexed. For instance, queries can be processed at the edge location where the streaming sensor data (or streaming content) was generated and indexed, as described above with respect to process 400 of FIG. 4. In such approaches and implementations, by processing queries on-site where the content was generated, retrieved content can be obtained that is responsive or relevant to the query, while ensuring that the retrieved content does not leave the local network. In one illustrative example, relevance and ranking associated with a query can be performed as close as possible to the sensors that generated the data, i.e., where the corresponding indexes were created and stored. In another illustrative example, personalization of retrieved content can be implemented locally, based on factors such as the preferences of the query issuer, intent information associated with the query and/or query issuer, context information associated with the query and/or query issuer, etc.

Figure 5:
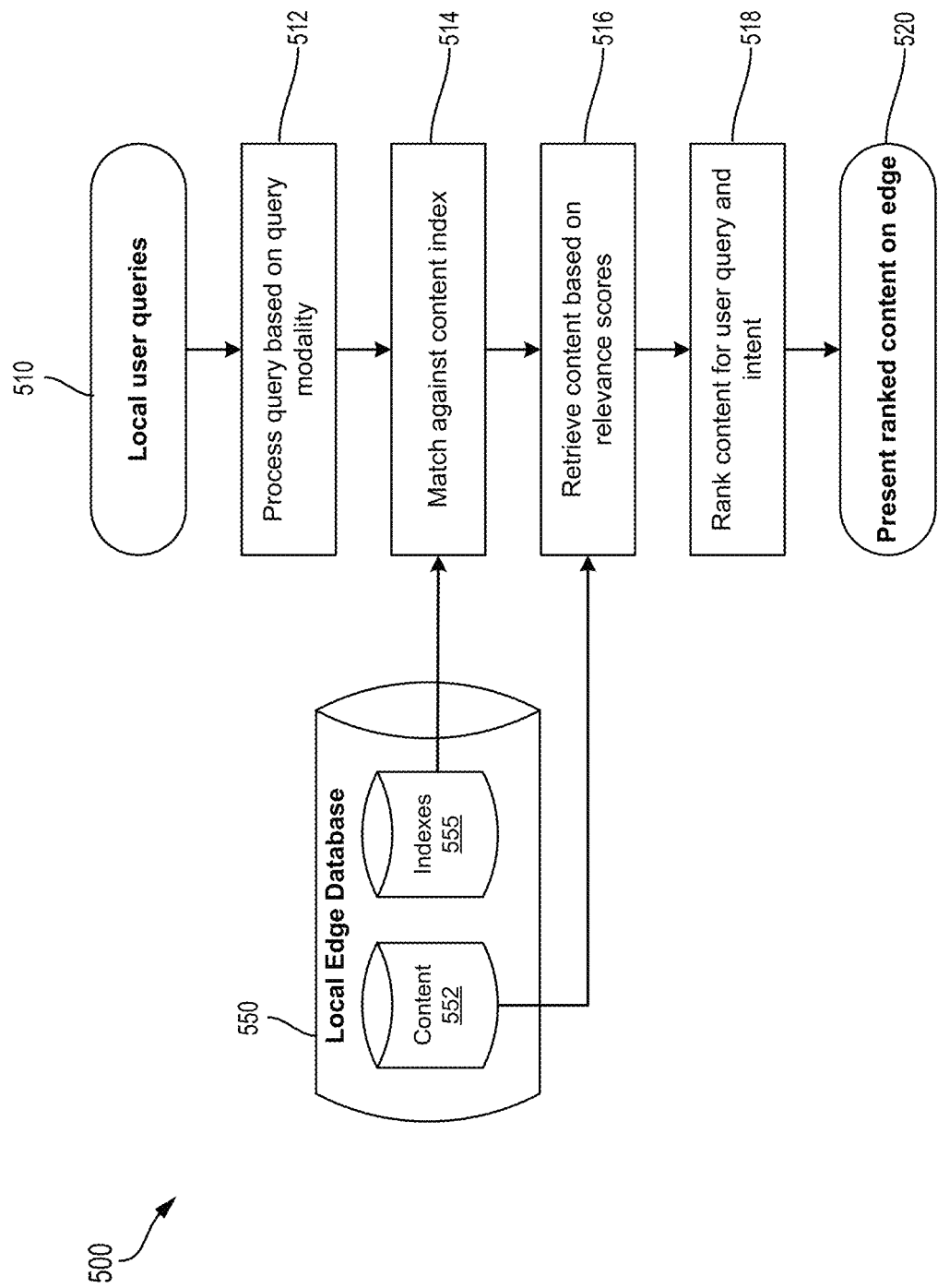
FIG. 5 is a diagram illustrating an example of content retrieval and ranking analysis that can be performed at the edge (e.g., by an edge computing system or device, and/or at an edge location), in accordance with some examples.

FIG. 5 is a diagram illustrating an example of content retrieval and ranking 500 that can be performed at the edge (e.g., by an edge computing system or device, and/or at an edge location), in accordance with some examples. The local edge database 550 of FIG. 5 can be the same as or similar to the local edge database 450 of FIG. 4. The content 552 and indexes 555 of FIG. 5 can be the same as or similar to the content 452 and indexes 455, respectively, of FIG. 4.

At block 510, one or more local user queries can be received at the edge and processed, at block 512, based on the query modality. For instance, the query modality can be indicative of a particular type or modality of sensor data that is to be searched. In some cases, the query modality can be contained, indicated, or specified in the local user query 510. In other examples, the query modality can be determined or inferred based on analyzing the local user query 510.

At block 514, the query can be matched against content index information in the inverse index generated using process 400 of FIG. 4. For instance, the query can be processed at the edge based on comparing the query information to the inverse indexes 555 store in local edge database 550. In some aspects, the query is compared with salient inverse indexes that were identified at the edge during the process 400 for generating the index information.

At block 516, relevant content for the query (e.g., responsive to the query) can be retrieved based on corresponding relevance scores calculated between the relevant content and the query information. For example, the relevance scores can be determined previously at block 514, or can be determined at block 516 as part of the content retrieval operation. The relevant content identified based on relevance scores can be retrieved from the local edge database 550, and can be included in the stored content 552 within local edge database 550. In some cases, the relevant content retrieved at block 516 can be content with a corresponding calculated relevance score that is greater than one or more thresholds and/or that satisfies one or more configured rules, etc. In some cases, relevance can be based on an assessment of the most-likely or high priority content that can potentially correspond to the query. In some cases, relevance can be based on the strength of the correspondence between a piece of indexed content and the query 510.

At block 518, the process 500 can include ranking the retrieved content (from block 516) for the user query and intent. In some cases, the user query intent information can be determined at block 512, or may be determined at block 518. In some cases, the relevance scores used for content retrieval at block 516 can comprise a first-pass evaluation of the content against the query, while the ranking of retrieved content at block 518 can comprise a second-pass or refinement of the first-pass against more detailed aspects of the query information of the local user query 510.

At block 520, the ranked relevant content can be presented on the edge, responsive to the local user query 510.

In one illustrative example, personalization of retrieved content can be performed when receiving a query. For instance, personalization of retrieved content can be done locally based on the preferences of the query issuer, the query or query user intent, and the query or query user context. In some cases, personalization of retrieved content can be implemented at block 516 and/or block 518 of the process 500.

Relevance can be user-specific, edge environment-specific, region-specific, etc. For instance, a user of an edge environment that monitors oil field equipment for signs of failure can have a higher relevance on queries for potential cracks in the edge sensor data, than a user of an edge environment that corresponds to a healthcare provider. In other words, the relevance and ranking determinations of the search and retrieval process corresponding to local edge query 510 can be personalized based on contextual information at the edge or of the user—in the example above, a query for the metadata tag 'crack' or 'cracking' can have a higher relevance in the oil field edge environment than in the medical provider edge environment, etc.

The content ranking of block 518 can additionally be relevance-adjusted or otherwise adjusted based on personalization/customization information corresponding to the query issuer and/or information specific to the edge context, edge environment/location, the region, technical or enterprise field, etc. For example, ranking and sorting at block 518 may be implemented based on an adjusted filtering that is personalized (customized) to the query issuer or edge location, such that types of content more commonly queried or retrieved at the particular edge location (or larger region, etc.) are more highly ranked in the results returned for local edge query 510. In some aspects, the personalization can be implemented based on a learning process over time, in which the system described herein can evaluate the query process performed by users to determine which pieces of retrieved content (or which portions of the inverse index) were most helpful to the actual queries being processed by the system. Based on the historical information of the correspondence between input queries and the retrieved content/indexes that were ultimately most helpful to (ort most correct for) the query, the personalization process can be implemented to provide continuous learning or improvement of the ranking operations at 518 for presenting the retrieved content for a given local edge query 510.

In some examples, personalization or customization (e.g., of retrieved content, rankings, relevance scoring) can be implemented based on modifications to the inverse index itself. For instance, personalization can be provided by controlling the composition of content over which the index is built. Personalization can also be implemented based on adjustments to the classification schemes or schema implemented by the one or more ML models used to extract features and generate embeddings that are used to generate the indexes. In some cases, as mentioned previously, separate indexes can be constructed at an edge location and in the cloud. For instance, the cloud index can be generated over a selection of salient content that is sent to the cloud for storage as persistent cloud content. In some examples, the persistent cloud content can be identical to the stored content at the edge, but the edge and the cloud may generate different indexes of the same information. For example, the edge and cloud indexes can be personalized (e.g., can vary) based on the subset(s) of the complete set of content that is actually indexed, based on the tagging or key scheme used for generating the index, etc.

For instance, if the queries received in the cloud are different in type, scope, nature, context, intent, etc., as compared to the queries received locally at the edge, it may be desirable to implement separate indexes for the edge (used to process queries at the edge) and for the cloud (used to process queries in the cloud). The cloud index can be generated based on the compact representation of salient content that is sent from the edge to the cloud. This compact representation can include the document IDs for each piece of salient content, and the one or more corresponding embeddings generated (at the edge) for the content of each document ID.

Figure 6:
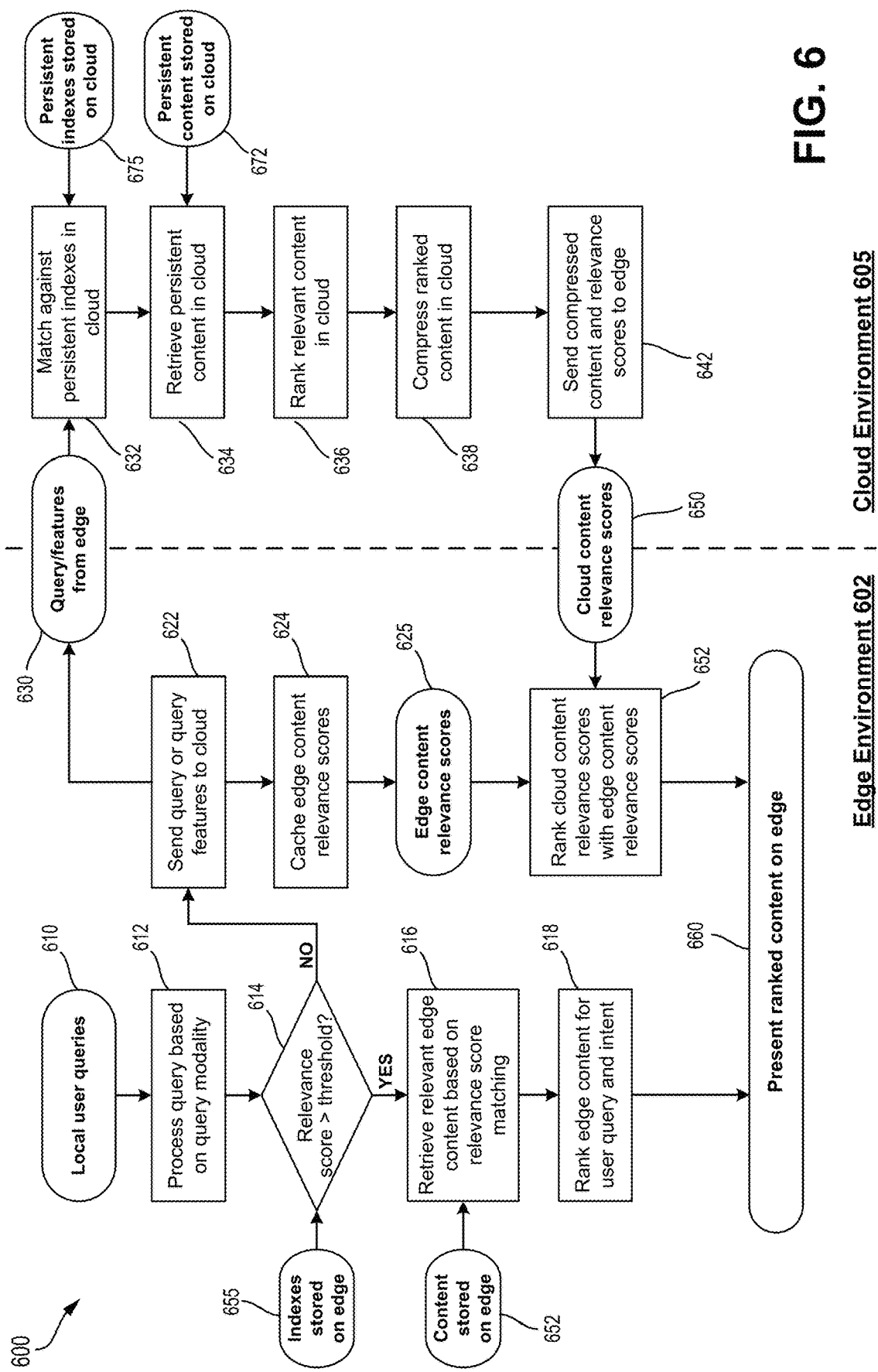
FIG. 6 is a diagram illustrating an example of content retrieval and ranking analysis that can be performed in the cloud based on local query information obtained at the edge (e.g., obtained by an edge computing system or device, and/or at an edge location), in accordance with some examples.

In one illustrative example, a hybrid-based implementation to retrieving and ranking content can be implemented across one or more edge locations and a cloud environment associated with the one or more edge locations. For example, FIG. 6 is a diagram illustrating a hybrid content retrieval and ranking analysis 600 that can be performed in the cloud based on local query information obtained at the edge (e.g., obtained by an edge computing system or device, and/or at an edge location), in accordance with some examples. In the example of FIG. 6, content can be retrieved from local edge storage, persistent cloud storage, or both, based on a relevance score determined based on a local user query 610.

In some cases, the local user queries 610 of FIG. 6 can be the same as or similar to the local user queries 510 of FIG. 5. The query processing block 612 of FIG. 6 can be the same as or similar to block 512 of FIG. 5. The indexes stored on the edge 655 and content stored on the edge 652 of FIG. 6 can be the same as or similar to the edge content 552 and edge indexes 555, respectively of FIG. 5, and/or the salient content and indexes stored on edge 420 of FIG. 4 and/or the content 452 and indexes 455 of local edge database 450 of FIG. 4; etc.

As noted above, it is contemplated that in some embodiments, indexed content may be stored across both the edge and the cloud, with the edge storing local data and the cloud storing persistent data. The persistent cloud data can be a subset of the local edge data, but may also be different from the local edge data. For example, the persistent cloud data may include a longer look back window of time compared to the local edge data, which may be deleted or archived at a shorter interval. The persistent cloud data can also include data received from multiple different edge locations. For example, the persistent cloud data can correspond to salient data and indexes from ten edge locations, where the respective local edge data at each edge location does not include the salient information identified at the nine other edge locations. In this example, the persistent cloud data can be a larger or more comprehensive dataset than the local edge dataset, although the opposite is also possible.

In some aspects, the process 600 of FIG. 6 can be used to perform content retrieval and ranking on the cloud or local queries, while accounting for the hybrid storage across the persistent cloud data and the local edge data. As described below, content from both edge and cloud storage can be ranked together. Notably, the persistent cloud content does not need to be retrieved immediately, thereby saving bandwidth on the backhaul. Instead, only the content that ranks sufficiently high enough and is selected by the user (query issuer) is retrieved from the cloud and transmitted to the edge for presentation the user (query issuer) in response to the local edge query 610.

At block 614, the process 600 includes determining a relevance score that can be used to perform the retrieval of content from the edge storage, persistent cloud storage, or both. The relevance score is compared to a threshold. In one illustrative example, the relevance score against the edge index information 655 is compared to a threshold. For instance, the relevance score can be based on evaluating the local user query 610 against the edge index information 655, and may indicate whether the indexed content available at the edge (e.g., as represented by the edge index information 655) is sufficiently relevant for the local edge user query 610.

If block 614 determines that the edge index-local query relevance score is greater than the threshold, the process can proceed to block 616 and retrieve the relevant content from the edge content store 652. Block 616 can be the same as or similar to block 516 of FIG. 5. At block 618, the process 600 includes ranking the retrieved relevant edge content for the user query and intent. Block 618 can be the same as or similar to block 518 of FIG. 5. Subsequently, at block 660, the process 600 includes presenting the ranked content on the edge (e.g., the same as or similar to the presentation of ranked content at the edge in block 520 of FIG. 5). In other words, if block 614 determines the edge relevance score for the query 610 exceeds the threshold, the process 600 can proceed in a manner the same as or similar to that described above with respect to process 500 of FIG. 5.

However, if block 614 determines that the edge relevance score for the query 610 is less than the threshold, the indexed content stored at the edge is not sufficiently relevant for resolving the local edge query 610. Accordingly, the process 600 can proceed to block 622, where one or more (or both) the query 610 and/or generated or extracted features of the query 610 are transmitted to the cloud. As shown in FIG. 6, the edge environment 602 is separate from the cloud environment 605. For example, edge environment 602 can be the same as or similar to the local site/edge environment 302 of FIG. 3 and cloud environment 605 can be the same as or similar to user cloud environments 370 of FIG. 3. In some cases, edge environment 602 can be associated with edge compute unit 330 of FIG. 3 and/or various other edge devices, including HPCS edge devices, etc.

At block 632, implemented in the cloud, the query/features 630 received from the edge (at block 622) can be processed and analyzed to match the edge query/features 630 against the persistent indexes 675 stored on the cloud. As noted previously above, the cloud persistent indexes 675 can be different from the edge stored indexes 655 (and correspondingly, the edge stored content 652 can be different from the persistent cloud stored content 672).

The process of matching the edge query/features 630 against the persistent cloud indexes 675 (e.g., the process of block 632) may be the same as or similar as the block 514 of process 500 in which local edge queries are matched against local edge indexes.

At block 634, persistent content can be retrieved from the persistent cloud content store 672, in a manner the same as or similar to the retrieval of relevant edge content at block 616 of FIG. 6 and/or the retrieval of relevant content at block 516 of FIG. 5.

At block 636, the relevant and/or ranked persistent cloud content can be determined, based on the persistent cloud content that was retrieved previously in block 634. The relevance and ranking determinations in the cloud can be the same as those performed at the edge, or can be different from those performed at the edge. For instance, in the context of hybrid search and retrieval process 600, the edge and the cloud can perform the same relevance and ranking determinations (but applied to the retrieved edge content and the retrieved cloud content, respectively), where the relevance and ranking determinations are based on the local edge query 610 and/or associated parameters of the query 610 (with such query parameters and associated query information determined at block 612, and included in the transmission of the edge query/features from the edge to the cloud at block 622).

In some aspects, the cloud-based ranking step 636 performed in the cloud for persistent cloud content can be the same as or similar to the edge-based ranking step 618 performed at the edge for local edge content. In some examples, the cloud-based ranking step 636 performed in the cloud for persistent cloud content can be the same as or similar to the edge-based ranking step 518 performed for the local edge content in FIG. 5.

At block 638, the cloud can compress the ranked persistent content determined in block 636. At block 642, the cloud environment 605 can be configured to send the compressed content (generated in block 638) and corresponding relevance scores (e.g., determined in block 634 and/or block 636) to the edge environment 602. Notably, the cloud content and relevance scores 650 can be determined in the cloud based on analyzing the edge query/features 630 against the persistent cloud data store of cloud indexes 675 and cloud content 672. The cloud-implemented search and retrieval can be performed using a cloud-specific personalization that can be different from an edge-specific personalization used at edge environment 602 and blocks 612-618.

Returning to the discuss of the process 600 implementation at the edge (at edge environment 602), after sending the edge query/features 6430 to the cloud 605 at step 622, the process 600 can continue at the edge in block 624, where the edge content relevance scores 625 can be cached or temporarily stored at the edge. In some aspects, the edge content relevance scores 625 can be cached or temporarily stored while the edge device 602 awaits the receipt of the relevant cloud content and relevance scores 650 identified in the cloud 605 (identified in the cloud based on the cloud performing the cloud-based search and retrieval for the local edge query 610 against the persistent cloud data 672, 675 as described above).

As mentioned previously, in the hybrid edge-cloud search and retrieval implemented in process 600, content from both the edge and cloud storages can be ranked together for the local edge query 610. As also mentioned previously, the content from the cloud (e.g., cloud content and relevance scores 650) need not be retrieved right away, thereby saving bandwidth on the backhaul between the edge 602 and the cloud 605. Only the persistent cloud content that ranks sufficiently high against the local edge query 610 (e.g., as determined by the cloud at block 634 and/or block 636) is retrieved from the cloud.

In some aspects, the cloud data transmission 650 may include only the cloud content relevance scores and other identifier or index information that allows the full persistent cloud content to be retrieved from the cloud 605 if needed or requested. For instance, the cloud data transmission 650 can be indicative of the relevant persistent cloud content identified against the edge query/features 630, such that at block 652, the edge device can determine a combined or hybrid ranking of cloud content and edge content. The composite ranking can intermingle cloud content relevance scores with edge content relevance scores. That is, the output of block 652 can be a ranking that intermingles pieces of local edge content identified and indexed as relevant at the edge 602, with pieces of persistent cloud content identified and indexed as relevant at the cloud 605. In some aspects, the ranking at block 652 can be a sort based on the edge content scores 625 and the cloud content scores 650, with no further ranking utilized (e.g., in examples where the edge content scores 625 and cloud content scores 650 use the same ranking system or metric). In other examples, the ranking at block 652 can comprise an additional analysis, processing, and/or ranking of the cloud and edge data, for instance based on metadata or additional information associated with some (or all) of the identified relevant persistent cloud content, the identified relevant local edge content, or a combination thereof. For instance, the persistent cloud content may include additional metadata information and/or tag information indicating that a particular piece of persistent cloud content was identified as salient at location/region/edge environment/use case x or at time y, etc.—metadata information that is relevant to the scope of the persistent cloud datastore across multiple edge environments, but which is not included in the scope of any single given one of the multiple edge environments. Accordingly, in such cases, the hybrid ranking performed at the edge at block 652 can account for additional such metadata information that is specific to the cloud environment 605 context.

At block 660, the ranked content (in this example, the ranked hybrid cloud and edge content from block 652) can be presented on the edge, in a manner the same as or similar to the presentation of edge-only content described above with respect to the output of block 618.

In some embodiments, persistent cloud-content index information is displayed on the edge in the presentation of ranked content 660. For instance, user selection or input may be required before the system retrieves the underlying persistent cloud content from the cloud 605 and sends it to the edge 602 for presentation to the user. In some aspects, the presentation of ranked content 660 can be indicative of the document ID, ranking or relevance information, index information, etc., associated with each piece of persistent cloud content, allowing the user (query issuer) to view a summary of the persistent cloud content and determine whether to request that the specific piece of persistent cloud content be pulled down from the persistent cloud content store 672 for viewing further at the edge 602.

In some examples, the systems and techniques described herein can be implemented or otherwise performed by a computing device, apparatus, or system. In one example, the systems and techniques described herein can be implemented or performed by a computing device or system having the computing device architecture 700 of FIG. 7. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Processes described herein can comprise a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
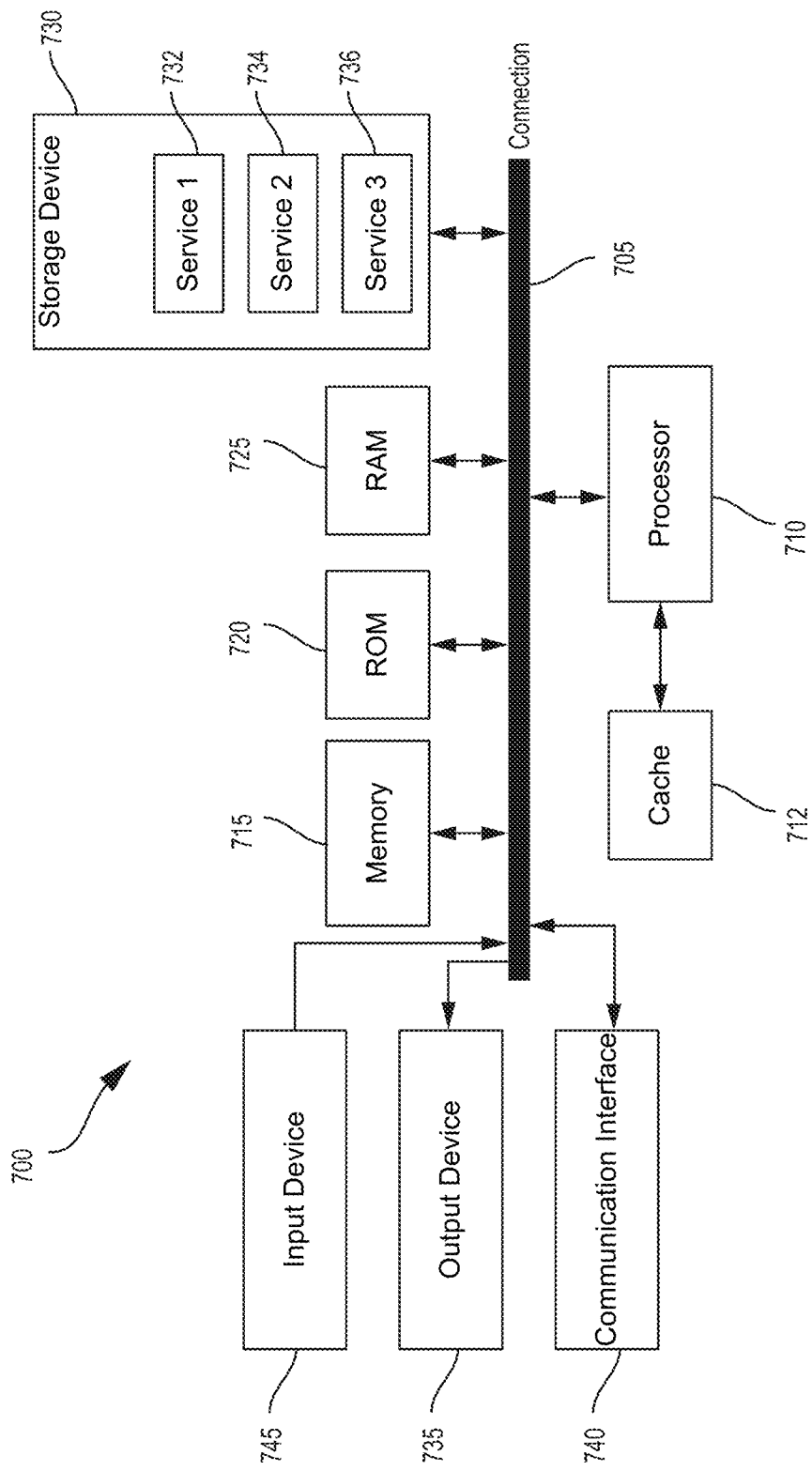
FIG. 7 is a block diagram illustrating an example of a computing system architecture that can be used to implement one or more aspects described herein, in accordance with some examples.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method comprising: obtaining, by an edge device, a plurality of data streams corresponding to objects, activities, or events registered in an edge environment associated with the edge device; generating, using one or more machine learning networks implemented on the edge device, a plurality of features corresponding to each respective data stream of the plurality of data streams; determining, by the edge device, a subset of salient content from the plurality of data streams, wherein the subset of salient content is determined based on analyzing the plurality of features generated for each respective data stream; generating, by the edge device, index information corresponding to the determined subset of salient content; and storing the subset of salient content and the generated index information locally at the edge device for search and retrieval based on local queries received at the edge device.

Aspect 2. The method of Aspect 1, wherein generating the plurality of features comprises: determining learned embeddings of the one or more machine learning networks for the plurality of data streams.

Aspect 3. The method of any of Aspects 1 to 2, wherein the index information is generated and stored locally at the edge device without using cloud connectivity and without the edge device communicating with a cloud compute entity.

Aspect 4. The method of any of Aspects 1 to 3, wherein the index information is generated based on one or more of feature extraction, embedding generation, or tokenization performed for the plurality of data streams and using the one or more machine learning networks implemented on the edge device.

Aspect 5. The method of Aspect 4, wherein determining the subset of salient content includes: analyzing the plurality of features to identify duplicate data streams, wherein duplicate data streams have same or similar features as the respective features of a previously indexed and stored data stream; and generating the subset of salient content to include the portion of the plurality of data streams not identified as duplicate data streams.

Aspect 6. The method of any of Aspects 4 to 5, wherein determining the subset of salient content includes: analyzing the plurality of features to classify an object or event present in a first data stream of the plurality of data streams; analyzing the plurality of features to classify an object or event present in a second data stream of the plurality of data streams, the second data stream different from the first data stream; and including the first data stream and the second data stream in the subset of salient content, based on classifying the same object or event as being present in the first data stream and the second data stream.

Aspect 7. The method of Aspect 6, wherein the first data stream and the second data stream are associated with the same modality of data type or sensor type.

Aspect 8. The method of any of Aspects 6 to 7, wherein the first data stream is associated with a first modality of data type or sensor type, and wherein the second data stream is associated with a second modality of data type or sensor type, the second modality different from the first modality.

Aspect 9. The method of any of Aspects 1 to 8, wherein the index information comprises an inverse index of the subset of salient content.

Aspect 10. The method of Aspect 9, wherein: keys of the inverse index comprise unique embeddings for the plurality of features; and one or more values mapped to each respective key of the keys of the inverse index comprise corresponding identifiers of each piece of content of the subset of salient content that is associated with the unique embedding comprising the respective key.

Aspect 11. The method of Aspect 10, further comprising: receiving, by the edge device, a local query for stored content; processing, by the edge device, the local query against the generated index information to obtain corresponding identifiers for one or more pieces of stored content; generating a ranked order for the one or more pieces of stored content, the ranked order based on one or more of the local query or intent information determined for the local query; and outputting, by the edge device, a user interface display indicative of the one or more pieces of stored content in the ranked order.

Aspect 12. The method of Aspect 11, wherein processing the local query against the generated index information comprises: determining inverse index keys corresponding to one or more search terms represented in the local query; determining a respective relevance score for the content mapped to each inverse index key corresponding to the one or more search terms represented in the local query; and outputting the corresponding identifiers of each piece of content with a respective relevance score greater than a configured threshold.

Aspect 13. The method of any of Aspects 1 to 12, further comprising: transmitting, by the edge device, identified content and corresponding index information for the identified content to a cloud entity, wherein the cloud entity is configured to store the identified content and corresponding index information in persistent cloud storage.

Aspect 14. The method of Aspect 13, wherein the identified content comprises at least a portion of the subset of salient content and is identified based on one or more of backhaul bandwidth availability between the edge device and the cloud entity or relevance information determined for the identified content.

Aspect 15. The method of any of Aspects 1 to 14, further comprising: transmitting, by the edge device, a plurality of embeddings corresponding to a portion of the subset of salient content, wherein the plurality of embeddings are transmitted to a cloud entity configured to generate a cloud-based inverse index using the plurality of embeddings, and wherein the cloud entity is configured to store the cloud-based inverse index as persistent cloud content.

Aspect 16. The method of Aspect 15, further comprising: receiving, by the edge device, a local query for stored content; determining that a relevance score of the local query against the subset of salient content stored at the edge device is less than a configured threshold; and in response, transmitting one or more of the local query or generated features corresponding to the local query to a cloud entity associated with the edge device.

Aspect 17. The method of Aspect 16, further comprising: receiving, by the edge device a set of persistent cloud content identified by the cloud entity based on the local query or generated features, wherein the set of persistent cloud content is not included in the subset of salient content stored at the edge device.

Aspect 18. The method of Aspect 17, further comprising: analyzing the subset of salient content stored at the edge device and the set of persistent cloud content to generate a composite hybrid ranking of edge content and persistent cloud content identified as relevant to the local query; and outputting, by the edge device, a user interface display indicative of the composite hybrid ranking of edge content and persistent cloud content.

Aspect 19. The method of Aspect 18, further comprising: receiving, by the user interface display and to the edge device, a user input indicative of a selection of a particular cloud content; transmitting, by the edge device, a request to the cloud for an underlying content stored in persistent cloud storage and corresponding to the selection; receiving, by the edge device, the underlying content corresponding to the selection; and outputting, by the edge device, the underlying content in the user interface display.

Aspect 20. The method of any of Aspects 1 to 19, wherein the plurality of features are generated in-situ at the edge device, and wherein the plurality of features are generated in substantially real-time.

Aspect 21. The method of any of Aspects 1 to 20, wherein the plurality of features are generated based on analyzing each respective data stream using a corresponding machine learning classifier, encoder, representational learner, or feature generator.

Aspect 22. The method of Aspect 21, wherein the corresponding machine learning network used to generate the plurality of features for a respective data stream is selected from a plurality of trained machine learning networks based on an identified data type modality of the respective data stream.

Aspect 23. The method of Aspect 22, wherein: a first machine learning network is used to perform one or more of feature extraction or embeddings extraction for each respective one of a first subset of the plurality of data streams comprising image data or video frames; a second machine learning network is used to perform one or more of feature extraction or embeddings extraction for each respective one of a second subset of the plurality of data streams comprising textual data; and a third machine learning network is used to perform one or more of feature extraction or embeddings extraction for each respective one of a third subset of the plurality of data streams comprising non-image or non-textual data.

Aspect 24. The method of any of Aspects 1 to 23, wherein each data stream of the plurality of data streams comprises a series of data content indicative of objects, activities, or events registered in a surrounding environment of the edge device or of a plurality of edge sensors associated with generating the data content.

Aspect 25. The method of any of Aspects 1 to 24, wherein: the edge device is included in a local edge environment; and each respective data stream of the plurality of data streams is obtained from a sensor or asset included in the same local edge environment as the edge device.

Aspect 26. The method of any of Aspects 1 to 25, wherein the plurality of data streams comprise multiple different data types and are obtained from a respective multiple different edge sensors.

Aspect 27. The method of Aspect 26, wherein the multiple different edge sensors include one or more of cameras, document scanners, range or distance scanners, accelerometers, gyroscopes, vibrometers, GPS, inertial measurement units, LiDARs, RADARs, ultrasonic sensors, or barcode scanners.

Aspect 28. An apparatus of an edge device for processing streaming data, comprising: at least one memory; and at least one processor coupled to the at least one memory, the at least one processor configured to: obtain, by the edge device, a plurality of data streams corresponding to objects, activities, or events registered in an edge environment associated with the edge device; generate, using one or more machine learning networks implemented on the edge device, a plurality of features corresponding to each respective data stream of the plurality of data streams; determine, by the edge device, a subset of salient content from the plurality of data streams, wherein the subset of salient content is determined based on analyzing the plurality of features generated for each respective data stream; generate, by the edge device, index information corresponding to the determined subset of salient content; and store the subset of salient content and the generated index information locally at the edge device for search and retrieval based on local queries received at the edge device.

Aspect 29. The apparatus of Aspect 28, wherein, to generate the plurality of features, the at least one processor is configured to: determine learned embeddings of the one or more machine learning networks for the plurality of data streams.

Aspect 30. The apparatus of any of Aspects 28 to 29, wherein the index information is generated and stored locally at the edge device without using cloud connectivity and without the edge device communicating with a cloud compute entity.

Aspect 31. The apparatus of any of Aspects 28 to 30, wherein the index information is generated based on one or more of feature extraction, embedding generation, or tokenization performed for the plurality of data streams and using the one or more machine learning networks implemented on the edge device.

Aspect 32. A non-transitory computer-readable medium having stored thereon instructions that, when executed by one or more processors, cause the one or more processors to perform actions comprising: obtaining, by an edge device, a plurality of data streams corresponding to objects, activities, or events registered in an edge environment associated with the edge device; generating, using one or more machine learning networks implemented on the edge device, a plurality of embeddings corresponding to one or more of the plurality of data streams; determining, by the edge device, a subset of salient content from the plurality of data streams, wherein the subset of salient content is determined based on analyzing the plurality of features generated for each respective data stream; generating, by the edge device, index information corresponding to the determined subset of salient content; and storing the subset of salient content and the generated index information locally at the edge device for search and retrieval based on local queries received at the edge device.

Aspect 33. An apparatus comprising means for performing any of the operations of Aspects 1 to 27.

Aspect 34. A non-transitory computer-readable storage medium having stored thereon instructions which, when executed by one or more processors, cause the one or more processors to perform any of the operations of Aspects 1 to 27.

What is claimed is:

1. A method comprising:
   obtaining, by an edge device, a plurality of data streams corresponding to objects, activities, and events registered in an edge environment associated with the edge device;
   generating, using one or more machine learning networks implemented on the edge device, a plurality of features corresponding to each respective data stream of the plurality of data streams;
   determining, by the edge device, a subset of salient content from the plurality of data streams, wherein the subset of salient content is determined based on analyzing the plurality of features generated for each respective data stream of the plurality of data streams, wherein the determining the subset of salient content includes:
      analyzing the plurality of features to identify duplicate data streams, wherein duplicate data streams have same or similar features as respective features of a previously indexed and stored data stream; and
      generating the subset of salient content to include a portion of the plurality of data streams not identified as duplicate data streams;
   generating, by the edge device, index information corresponding to the determined subset of salient content; and
   storing the subset of salient content and the generated index information locally at the edge device for search and retrieval based on local queries received at the edge device, wherein at least a portion of the subset of salient content is stored based on bandwidth availability between the edge device and a cloud entity;
   determining a respective relevance score for portions of the stored subset of salient content mapped to each inverse index key of inverse index keys; and
   outputting, based on a received local query of the received local queries, corresponding identifiers of pieces of the stored subset of salient content with respective relevance score greater than a configured threshold.

2. The method of claim 1, wherein generating the plurality of features comprises: determining learned embeddings of the one or more machine learning networks for the plurality of data streams.

3. The method of claim 1, wherein the index information is generated and stored locally at the edge device without using cloud connectivity and without the edge device communicating with a cloud compute entity.

4. The method of claim 1, wherein the index information is generated based on one or more of feature extraction, embedding generation, or tokenization performed for the plurality of data streams and using the one or more machine learning networks implemented on the edge device.

5. The method of claim 4, wherein determining the subset of salient content includes:
   analyzing the plurality of features to classify an object or event present in a first data stream of the plurality of data streams;
   analyzing the plurality of features to classify an object or event present in a second data stream of the plurality of data streams, the second data stream different from the first data stream; and
   including the first data stream and the second data stream in the subset of salient content, based on classifying a same object or event as being present in the first data stream and the second data stream.

6. The method of claim 5, wherein the first data stream and the second data stream are associated with a same modality of data type or sensor type.

7. The method of claim 5, wherein the first data stream is associated with a first modality of data type or sensor type, and wherein the second data stream is associated with a second modality of data type or sensor type, the second modality different from the first modality.

8. The method of claim 1, wherein the index information comprises an inverse index of the subset of salient content.

9. The method of claim 8, wherein:
   keys of the inverse index comprise unique embeddings for the plurality of features; and
   one or more values mapped to each respective key of the keys of the inverse index comprise corresponding identifiers of each piece of content of the subset of salient content that is associated with the unique embeddings comprising the respective key.

10. The method of claim 9, further comprising:
    receiving, by the edge device, a local query for stored content;
    processing, by the edge device, the local query against the generated index information to obtain corresponding identifiers for one or more pieces of stored content;
    generating a ranked order for the one or more pieces of stored content, the ranked order based on one or more of the local query or intent information determined for the local query; and
    outputting, by the edge device, a user interface display indicative of the one or more pieces of stored content in the ranked order.

11. The method of claim 10, wherein processing the local query against the generated index information comprises:
    determining inverse index keys corresponding to one or more search terms represented in the local query;
    determining a respective relevance score for the content mapped to each inverse index key corresponding to the one or more search terms represented in the local query; and
    outputting the corresponding identifiers of each piece of content with a respective relevance score greater than a configured threshold.

12. The method of claim 1, further comprising: transmitting, by the edge device, identified content and corresponding index information for the identified content to a cloud entity, wherein the cloud entity is configured to store the identified content and corresponding index information in persistent cloud storage.

13. The method of claim 12, wherein the identified content comprises at least a portion of the subset of salient content and is identified based on one or more of backhaul bandwidth availability between the edge device and the cloud entity or relevance information determined for the identified content.

14. The method of claim 1, further comprising:
transmitting, by the edge device, a plurality of embeddings corresponding to a portion of the subset of salient content, wherein the plurality of embeddings are is transmitted to a cloud entity configured to generate a cloud-based inverse index using the plurality of embeddings, and wherein the cloud entity is configured to store the cloud-based inverse index as persistent cloud content.

15. The method of claim 14, further comprising:
receiving, by the edge device, a local query for stored content;
determining that a relevance score of the local query against the subset of salient content stored at the edge device is less than a configured threshold; and
in response, transmitting one or more of the local query or generated features corresponding to the local query to a cloud entity associated with the edge device.

16. The method of claim 15, further comprising:
receiving, by the edge device, a set of persistent cloud content identified by the cloud entity based on the local query or generated features, wherein the set of persistent cloud content is not included in the subset of salient content stored at the edge device.

17. The method of claim 16, further comprising:
analyzing the subset of salient content stored at the edge device and the set of persistent cloud content to generate a composite hybrid ranking of edge content and persistent cloud content identified as relevant to the local query; and
outputting, by the edge device, a user interface display indicative of the composite hybrid ranking of edge content and persistent cloud content.

18. The method of claim 17, further comprising:
receiving, by the user interface display and to the edge device, a user input indicative of a selection of a particular cloud content;
transmitting, by the edge device, a request to the cloud entity for an underlying content stored in persistent cloud storage and corresponding to the selection;
receiving, by the edge device, the underlying content corresponding to the selection; and
outputting, by the edge device, the underlying content in the user interface display.

19. The method of claim 1, wherein the plurality of features are is generated in-situ at the edge device, and wherein the plurality of features are is generated in substantially real-time.

20. The method of claim 1, wherein the plurality of features are is generated based on analyzing each respective data stream using a corresponding machine learning classifier, encoder, representational learner, or feature generator.

21. The method of claim 20, wherein the corresponding machine learning network used to generate the plurality of features for a respective data stream is selected from a plurality of trained machine learning networks based on an identified data type modality of the respective data stream.

22. The method of claim 21, wherein:
a first machine learning network is used to perform one or more of feature extraction or embeddings extraction for each respective one data stream of a first subset of the plurality of data streams comprising image data or video frames;
a second machine learning network is used to perform one or more of feature extraction or embeddings extraction for each respective one of a second subset of the plurality of data streams comprising textual data; and
a third machine learning network is used to perform one or more of feature extraction or embeddings extraction for each respective one data stream of a third subset of the plurality of data streams comprising non-image or non-textual data.

23. The method of claim 1, wherein each data stream of the plurality of data streams comprises a series of data content indicative of objects, activities, or events registered in a surrounding environment of the edge device or of a plurality of edge sensors associated with generating the data content.

24. The method of claim 1, wherein:
the edge device is included in a local edge environment; and
each respective data stream of the plurality of data streams is obtained from a sensor or asset included in a same local edge environment as the edge device.

25. The method of claim 1, wherein:
the plurality of data streams comprises multiple different data types and is obtained from a respective multiple different edge sensors; and
the multiple different edge sensors include one or more of cameras, document scanners, range or distance scanners, accelerometers, gyroscopes, vibrometers, global positioning system (GPS), inertial measurement units, LiDARs, RADARs, ultrasonic sensors, or barcode scanners.

26. An apparatus of an edge device for processing streaming data, comprising:
at least one memory; and at least one processor coupled to the at least one memory, the at least one processor configured to:
obtain, by an edge device, a plurality of data streams corresponding to objects, activities, and events registered in an edge environment associated with the edge device;
generate, using one or more machine learning networks implemented on the edge device, a plurality of features corresponding to each respective data stream of the plurality of data streams;
determine, by the edge device, a subset of salient content from the plurality of data streams, wherein the subset of salient content is determined based on analyzing the plurality of features generated for each respective data stream of the plurality of data streams, wherein the determining the subset of salient content includes:
analyze the plurality of features to identify duplicate data streams, wherein duplicate data streams have same or similar features as respective features of a previously indexed and stored data stream; and
generate the subset of salient content to include a portion of the plurality of data streams not identified as duplicate data streams;
generate, by the edge device, index information corresponding to the determined subset of salient content; and
store the subset of salient content and the generated index information locally at the edge device for search and retrieval based on local queries received at the edge device, wherein at least a portion of the subset of salient content is stored based on bandwidth availability between the edge device and a cloud entity;

determine a respective relevance score for portions of the stored subset of salient content mapped to each inverse index key of inverse index keys; and output, based on a received local query of the received local queries, corresponding identifiers of pieces of the stored subset of salient content with respective relevance score greater than a configured threshold.

27. The apparatus of claim 26, wherein, to generate the plurality of features, the at least one processor is configured to: determine learned embeddings of the one or more machine learning networks for the plurality of data streams.

28. The apparatus of claim 26, wherein:
the index information is generated and stored locally at the edge device without using cloud connectivity and without the edge device communicating with a cloud compute entity; and
the index information is generated based on one or more of feature extraction, embedding generation, or tokenization performed for the plurality of data streams and using the one or more machine learning networks implemented on the edge device.

29. A non-transitory computer-readable medium having stored thereon instructions that, when executed by one or more processors, cause the one or more processors to perform actions comprising:
obtaining, by an edge device, a plurality of data streams corresponding to objects, activities, and events registered in an edge environment associated with the edge device;
generating, using one or more machine learning networks implemented on the edge device, a plurality of features corresponding to each respective data stream of the plurality of data streams;
determining, by the edge device, a subset of salient content from the plurality of data streams, wherein the subset of salient content is determined based on analyzing the plurality of features generated for each respective data stream of the plurality of data streams, wherein the determining the subset of salient content includes:
analyzing the plurality of features to identify duplicate data streams, wherein duplicate data streams have same or similar features as respective features of a previously indexed and stored data stream; and
generating the subset of salient content to include a portion of the plurality of data streams not identified as duplicate data streams;
generating, by the edge device, index information corresponding to the determined subset of salient content; and
storing the subset of salient content and the generated index information locally at the edge device for search and retrieval based on local queries received at the edge device, wherein at least a portion of the subset of salient content is stored based on bandwidth availability between the edge device and a cloud entity;
determining a respective relevance score for portions of the stored subset of salient content mapped to each inverse index key of inverse index keys; and
outputting, based on a received local query of the received local queries, corresponding identifiers of pieces of the stored subset of salient content with respective relevance score greater than a configured threshold.

* * * * *